(12) United States Patent
Sagasta et al.

(10) Patent No.: US 11,581,821 B2
(45) Date of Patent: Feb. 14, 2023

(54) MULTI-LEVEL INVERTER TOPOLOGIES FOR MEDIUM- AND HIGH-VOLTAGE APPLICATIONS

(71) Applicant: SCHNEIDER ELECTRIC IT CORPORATION, Foxboro, MA (US)

(72) Inventors: Kepa Odriozola Sagasta, Grenoble (FR); Thierry Meynard, Toulouse (FR); Alain Lacarnoy, Saint Nazaire les Eymes (FR)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/883,174

(22) Filed: May 26, 2020

(65) Prior Publication Data
US 2020/0389099 A1 Dec. 10, 2020

Related U.S. Application Data

(60) Provisional application No. 62/858,239, filed on Jun. 6, 2019.

(51) Int. Cl.
*H02M 7/487* (2007.01)
*H02J 9/06* (2006.01)
(Continued)

(52) U.S. Cl.
CPC ............. *H02M 7/487* (2013.01); *H02J 9/062* (2013.01); *H02M 3/158* (2013.01);
(Continued)

(58) Field of Classification Search
CPC .................................. H02M 7/483; H02J 9/062
See application file for complete search history.

(56) References Cited

U.S. PATENT DOCUMENTS 7,974,106 B2 * 7/2011 Gurunathan .......... H02M 7/497
363/69
8,288,891 B2 * 10/2012 Ballantine ............... H02J 1/102
307/65
(Continued)

FOREIGN PATENT DOCUMENTS

CN 104682753 A 6/2015
FR 3084798 A1 2/2020

OTHER PUBLICATIONS

Do E Dutra Ailton et al: High-Frequency Pulsating DC-Link Three-Phase Multilevel NPC Inverter Without Electrolytic Capacitor, 2018 IEEE Energy Conversion Congress and Exposition (ECCE), IEEE, Sep. 23, 2018 (Sep. 23, 2018), pp. 1348-1355, XP033464158, DOI: 10.1109/ECCE.2018.8558091.
(Continued)

*Primary Examiner* — Daniel Kessie
(74) *Attorney, Agent, or Firm* — Lando & Anastasi, LLP

(57) ABSTRACT

A power switching circuit including a first DC/DC converter having a first input configured to receive a first input DC voltage, a second DC/DC converter having a first input configured to receive a second input DC voltage, a DC/AC inverter having a first input coupled to the output of the first DC/DC converter and a second input coupled to the output of the second DC/DC converter, the DC/AC inverter including n (n>2) switching legs, and at least one controller coupled to the first DC/DC converter, the second DC/DC converter, and the DC/AC inverter, the at least one controller configured to operate the DC/AC inverter to provide n AC signals to at least one load coupled to the DC/AC inverter by operating two of the n switching legs in a static state and n−2 of the n switching legs in a transition state.

20 Claims, 28 Drawing Sheets

(51) Int. Cl.
  *H02M 3/158*  (2006.01)
  *H02M 7/5387* (2007.01)
  *H02M 7/483*  (2007.01)
  *H02M 1/00*   (2006.01)

(52) U.S. Cl.
  CPC ..... *H02M 7/4837* (2021.05); *H02M 7/53871* (2013.01); *H02M 1/0054* (2021.05); *H02M 1/0095* (2021.05)

(56) References Cited

U.S. PATENT DOCUMENTS

| | | | | |
|---|---|---|---|---|
| 10,833,601 | B2* | 11/2020 | Xie | H02M 7/5395 |
| 2002/0172062 | A1* | 11/2002 | Furukawa | B60L 15/025 |
| | | | | 363/132 |
| 2006/0152085 | A1* | 7/2006 | Flett | H02M 7/003 |
| | | | | 307/75 |
| 2009/0069142 | A1* | 3/2009 | Welchko | B60K 6/445 |
| | | | | 475/276 |
| 2011/0273130 | A1* | 11/2011 | Lee | H02J 3/381 |
| | | | | 320/101 |
| 2012/0320650 | A1 | 12/2012 | Weinmann et al. | |
| 2015/0016159 | A1* | 1/2015 | Deboy | H02J 3/383 |
| | | | | 363/71 |
| 2016/0056732 | A1* | 2/2016 | Jussila | H02M 7/537 |
| | | | | 363/131 |
| 2017/0155321 | A1 | 6/2017 | Kidera et al. | |
| 2017/0310238 | A1 | 10/2017 | Fu | |
| 2017/0366029 | A1* | 12/2017 | McKenna | H02J 9/065 |
| 2018/0062538 | A1 | 3/2018 | Tannhauser | |
| 2018/0083525 | A1* | 3/2018 | Abu-Hajar | H02M 1/12 |
| 2018/0109123 | A1* | 4/2018 | Kaufmann | H02J 7/0013 |

OTHER PUBLICATIONS

Extended European Search Report from corresponding European Application No. 20177526.9 dated Sep. 28, 2020.

Milosz Szarek et al: "NPC three level inverter with dual DC bus for independent distributed generators. Neutral-point voltage balancing under the input power imbalance", 2017 19th European Conference on Power Electronicsand Applications (EPE'17 ECCE Europe), vol. 2284, Sep. 1, 2017 (Sep. 1, 2017), pp. P.1-P.10, XP055547450, DOI: 10.23919/EPE17ECCEEurope.2017.8099240, ISBN: 978-90-75-81527-6.

Mihalache, Liviu, "A Hybrid 2/3 Level Converter With Minimum Switch Count", Power Conversion Technologies Inc., Harmony, USA, 2006, IEEE, pp. 611-618.

Muniz, J. Helder G. et al., "An Improved Pulse-Width-Modulation for the Modified Hybrid 2/3-LEVEL Converter," Dept. Engenharia Electrica, UFCG, Brasil, 2013, IEEE, pp. 248-253.

* cited by examiner

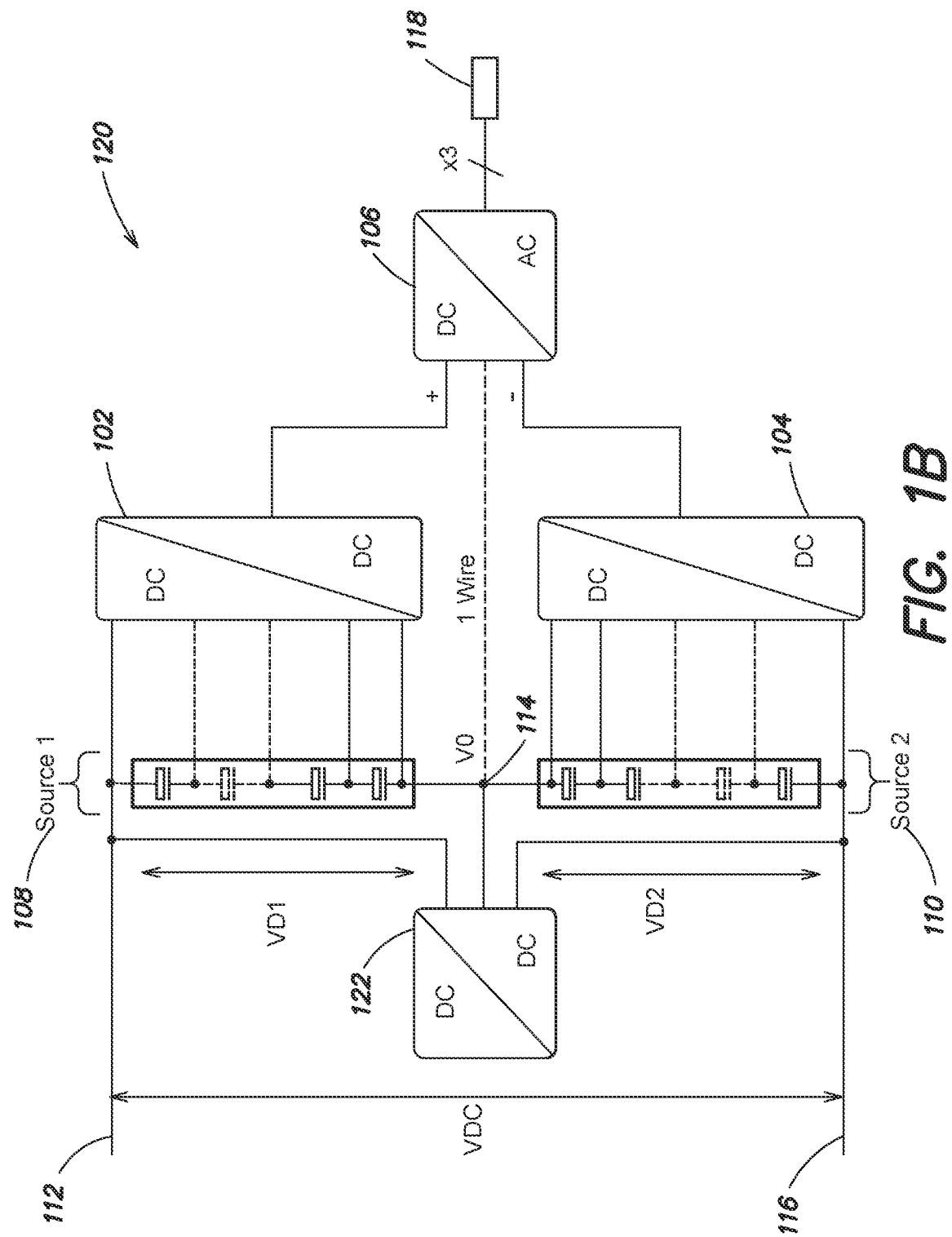

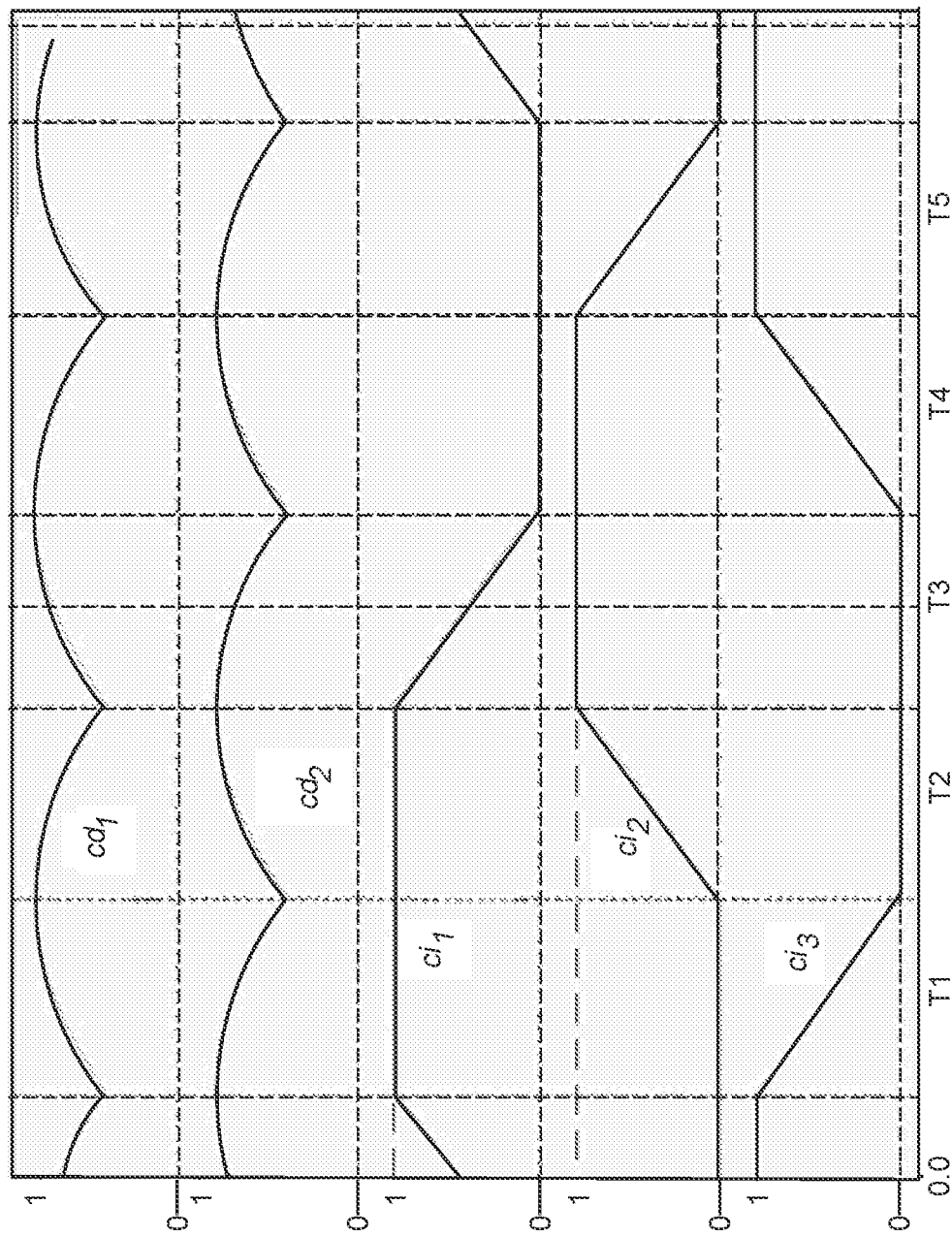

MULTI-LEVEL INVERTER TOPOLOGIES FOR MEDIUM- AND HIGH-VOLTAGE APPLICATIONS

CROSS-REFERENCE TO RELATED APPLICATION

This application claims priority to U.S. Provisional Patent Application No. 62/858,239 filed Jun. 6, 2019, entitled MULTI-LEVEL INVERTER TOPOLOGIES FOR MEDIUM- AND HIGH-VOLTAGE APPLICATIONS, which is hereby incorporated herein by reference in its entirety.

BACKGROUND

1. Field of Invention

The present invention relates generally to systems and methods for providing high-efficiency power conversion for medium and high voltage applications.

2. Discussion of Related Art

Power inverters are used to convert DC power to AC power and are typically most efficient in low-voltage applications, as switching losses can be relatively high in medium- and high-voltage applications. The use of power inverters in high-speed switching applications can also reduce efficiency, as the output power of such power inverters can decrease quickly at high switching speeds. In addition, the use of high voltage switches in power inverter circuitry can lead to increased costs.

SUMMARY

At least one aspect of the present disclosure is directed to a power switching circuit including a first DC/DC converter having a first input configured to receive a first input DC voltage and an output configured to provide a first output DC voltage, a second DC/DC converter having a first input configured to receive a second input DC voltage and an output configured to provide a second output DC voltage, a DC/AC inverter having a first input coupled to the output of the first DC/DC converter and a second input coupled to the output of the second DC/DC converter, the DC/AC inverter including n (n>2) switching legs, each switching leg having k switching cells coupled between the first input and the second input, and at least one controller coupled to the first DC/DC converter, the second DC/DC converter, and the DC/AC inverter, the at least one controller configured to operate the DC/AC inverter to provide n AC signals to at least one load coupled to the DC/AC inverter by operating two of the n switching legs in a static state and n−2 of the n switching legs in a transition state.

In one embodiment, the first and second DC/DC converters are multi-level converters. In some embodiments, the power switching circuit includes a positive DC bus coupled to the first DC/DC converter, a negative DC bus coupled to the second DC/DC converter, and a first DC voltage source and a second DC voltage source coupled between the positive DC bus and the negative DC bus, the first DC voltage source configured to provide the first input DC voltage to the first DC/DC converter and the second DC voltage source configured to provide the second input DC voltage to the second DC/DC converter. In certain embodiments, the first DC/DC converter is coupled directly to the first DC voltage source and the second DC/DC converter is coupled directly to the second DC voltage source.

In some embodiments, the first input DC voltage and the second input DC voltage correspond to allocated portions of an input DC voltage between the positive DC bus and the negative DC bus. In various embodiments, the first input DC voltage and the second input DC voltage correspond to substantially equal portions of the input DC voltage. In one embodiment, the power switching circuit includes a third DC voltage source coupled between the first and second DC voltage sources and configured to store an intermediate portion of the input DC voltage. In certain embodiments, the power switching circuit includes a bus balancer configured to regulate the first DC voltage, the second DC voltage, and the intermediate portion of the input DC voltage across the first, second, and third DC voltage sources. In some embodiments, the controller is configured to operate the first DC/DC converter such that the first output DC voltage is a positive variable DC voltage having a first duty cycle and to operate the second DC/DC converter such that the second output DC voltage is a negative variable DC voltage having a second duty cycle.

In one embodiment, the first and second DC/DC converters each include m switching cells. In certain embodiments, each switching cell of the m switching cells includes at least a first switch and a second switch, the first and second switches being configured to operate in complementary states. In some embodiments, the at least one controller is configured to control the first and second switches of the m switching cells of the first DC/DC converter using complementary pulse width modulation (PWM) signals to provide the positive variable DC voltage. In various embodiments, the at least one controller is configured to control the first and second switches of the m switching cells of the second DC/DC converter using complementary pulse width modulation (PWM) signals to provide the negative variable DC voltage.

In some embodiments, the first DC/DC converter includes at least one first switching cell coupled between the first input and a second input of the first DC/DC converter and the second DC/DC converter includes at least one second switching cell coupled between the first input and a second input of the second DC/DC converter. In certain embodiments, the first DC/DC converter includes at least one third switching cell coupled in parallel with the at least one first switching cell of the first DC/DC converter and the second DC/DC converter includes at least one fourth switching cell coupled in parallel with the at least one second switching cell of the second DC/DC converter. In various embodiments, the first DC/DC converter includes at least one third switching cell coupled between the at least one first switching cell and the output of the first DC/DC converter and the second DC/DC converter includes at least one fourth switching cell coupled between the at least one second switching cell and the output of the second DC/DC converter.

In one embodiment, the first DC/DC converter includes a first capacitor coupled to the third switching cell and the second DC/DC converter includes a second capacitor coupled to the fourth switching cell, the first capacitor configured to store a portion of the first input DC voltage and the second capacitor configured to store a portion of the second input DC voltage. In some embodiments, the first input of the DC/AC inverter is coupled directly to the output of the first DC/DC converter to receive the positive variable DC voltage and the second input of the DC/AC inverter is coupled directly to the output of the second DC/DC converter to receive negative variable DC voltage. In certain embodiments, the DC/AC inverter includes a third input coupled between the first and second DC voltage sources.

In some embodiments, each switching leg of the n switching legs includes one or more switching cells coupled in series between the first and second inputs of the DC/AC inverter. In one embodiment, each switching leg of the n switching legs includes at least one switching cell coupled in parallel with the series-coupled switching cells.

In various embodiments, each switching cell of the k switching cells includes at least a first and a second switch coupled between the first and second inputs of the at least one DC/AC inverter and an output between the first and second switches. In one embodiment, each switching leg operating in the static state is configured to provide a static output voltage to the load derived from one of the positive DC variable voltage and the negative DC variable voltage. In some embodiments, the output of each switching leg operating in the static state is coupled via at least one of the k switching cells to one of the first and second inputs of the DC/AC inverter.

In one embodiment, the static output voltage corresponds to one of the most positive and most negative portions of the n AC signals. In some embodiments, each switching leg operating in the transition state is configured to provide a transition output voltage to the at least one load derived from the positive DC variable voltage and the negative variable DC voltage. In certain embodiments, the output of each switching leg operating in the transition state is switched via at least one of the k switching cells between at least the first and second inputs of the DC/AC inverter. In various embodiments, the transition output voltage corresponds to intermediate portions of the n AC signals.

Another aspect of the present disclosure is directed to a method for operating a power switching circuit including receiving a positive DC voltage at an input of a first DC/DC converter and a negative DC voltage at an input of a second DC/DC converter, controlling the first DC/DC converter to provide a first DC voltage and the second DC/DC converter to provide a second DC voltage, receiving the first DC voltage at a first input of a DC/AC inverter and receiving the second DC voltage at a second input of the DC/AC inverter, the DC/AC inverter having n (n>2) switching legs having k switching cells, and controlling the DC/AC inverter to provide n AC output signals derived from the first and second DC voltages by operating two of the n switching legs in a static state and n−2 switching legs in a transition state at any given time.

In one embodiment, controlling the first DC/DC converter to provide the first DC voltage includes operating the first DC/DC converter such that the first DC voltage is a first variable DC voltage having a first duty cycle. In some embodiments, controlling the second DC/DC converter to provide the second DC voltage includes operating the second DC/DC converter such that the second DC voltage is a second variable DC voltage having a second duty cycle.

In various embodiments, operating each respective switching leg in the static state includes controlling the switching leg to provide a static output voltage derived from one of the first variable DC voltage and the second variable DC voltage. In some embodiments, the static output voltage corresponds to one of the most positive and most negative portions of the n AC output signals. In one embodiment, operating each respective switching leg in the transition state includes controlling the switching leg to provide an output voltage derived from the first variable DC voltage and the second variable DC voltage. In certain embodiments, the transition output voltage corresponds to intermediate portions of the n AC output signals.

Another aspect of the present invention is directed to an Uninterruptible Power Supply (UPS) system. The UPS system includes an input configured to be coupled to an AC source and to receive input AC power from the AC source, an output configured to provide output AC power to a load, a converter coupled to the input and configured to convert the input AC power into DC power, a DC bus coupled to the converter and configured to receive DC power from the converter, a first DC/DC converter having a first input configured to receive a first input DC voltage and an output configured to provide a first output DC voltage, a second DC/DC converter having a first input configured to receive a second input DC voltage and an output configured to provide a second output DC voltage, at least one DC/AC inverter having a first input coupled to the output of the first DC/DC converter and a second input coupled to the output of the second DC/DC converter, the at least one DC/AC inverter including n (n>2) switching legs, each switching leg having k switching cells coupled between the first input and the second input, and at least one controller coupled to the first DC/DC converter, the second DC/DC converter, and the DC/AC inverter, the at least one controller configured to operate the at least one DC/AC inverter to provide n AC signals to the output coupled to the at least one DC/AC inverter by operating two of the n switching legs in a static state and n−2 of the n switching legs in a transition state.

In one embodiment, the DC bus is configured to receive DC power from the first and second DC/DC converters. In some embodiments, the converter is configured to receive DC power from the DC bus, convert the DC power into AC power, and provide AC power to the AC source coupled to the input. In some embodiments, the first and second DC/DC converters are multi-level converters.

In certain embodiments, the UPS system includes a positive rail of the DC bus coupled to the first DC/DC converter, a negative rail of the DC bus coupled to the second DC/DC converter, and a first DC voltage source and a second DC voltage source coupled between the positive rail of the DC bus and the negative rail of the DC bus, the first DC voltage source configured to provide the first input DC voltage to the first DC/DC converter and the second DC voltage source configured to provide the second input DC voltage to the second DC/DC converter. In one embodiment, the first input DC voltage and the second input DC voltage correspond to allocated portions of a DC bus voltage between the positive rail of the DC bus and the negative rail of the DC bus. In various embodiments, the UPS system includes a third DC voltage source coupled between the first and second DC voltage sources and configured to store an intermediate portion of the DC bus voltage. In some embodiments, the UPS system includes a bus balancer configured to regulate the first DC voltage, the second DC voltage, and the intermediate portion of the DC bus voltage across the first, second, and third voltage sources.

In one embodiment, the controller is configured to operate the first DC/DC converter such that the first output DC voltage is a positive variable DC voltage having a first duty cycle and to operate the second DC/DC converter such that the second output DC voltage is a negative variable DC voltage having a second duty cycle. In some embodiments, each switching leg operating in the static state is configured to provide a static output voltage to the output derived from one of the positive DC variable voltage and the negative DC variable voltage. In certain embodiments, the static output voltage corresponds to one of the most positive and most negative portions of the n AC signals. In one embodiment, each switching leg operating in the transition state is configured to provide a transition output voltage to the output derived from the positive DC variable voltage and the negative variable DC voltage. In various embodiments, the transition output voltage corresponds to intermediate portions of the n AC signals.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 1B is a block diagram of a power switching topology according to aspects described herein;

FIG. 2C is a graph illustrating examples of a power switching control signals according to aspects described herein;

DETAILED DESCRIPTION

Figure 1A:
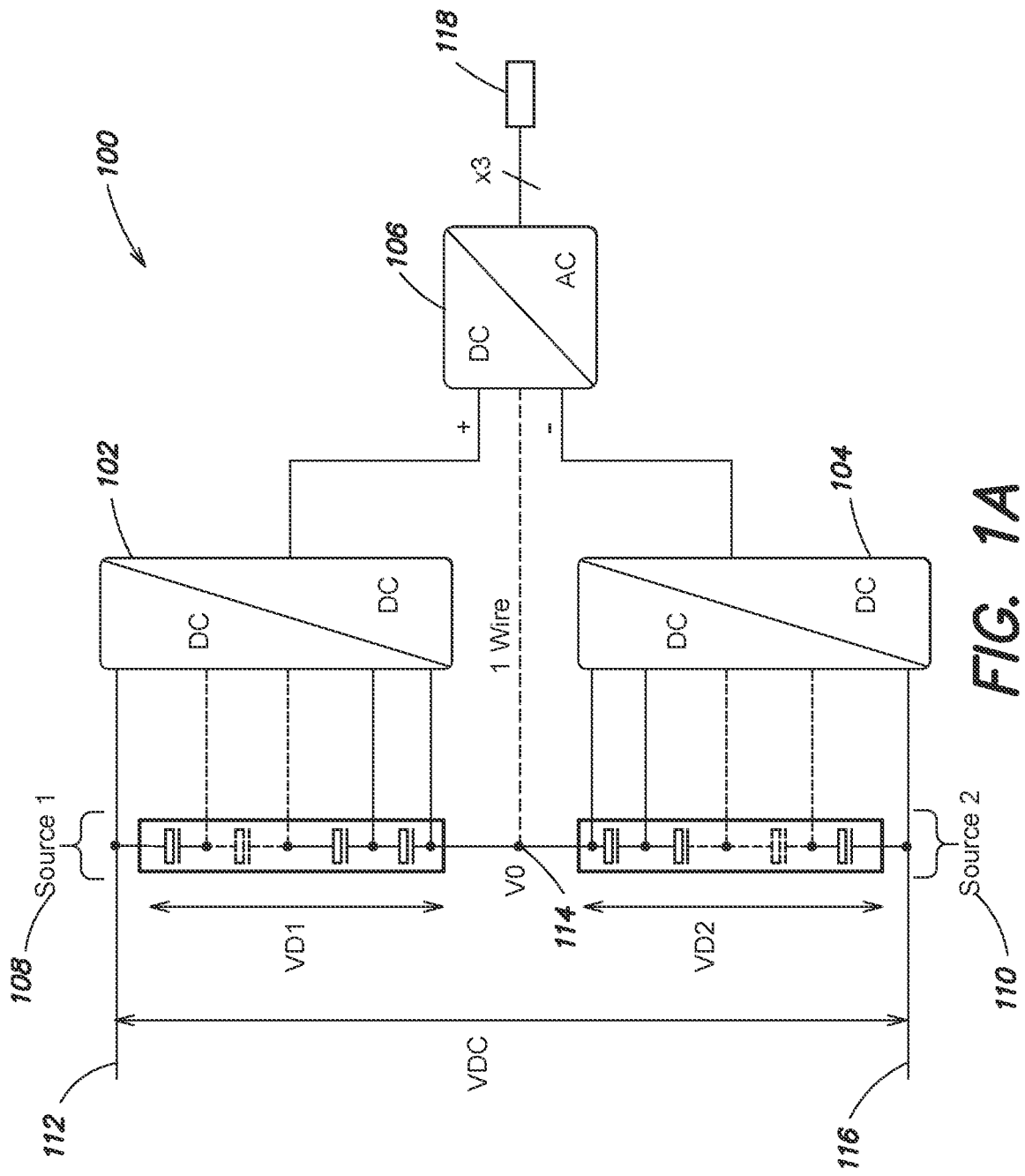
FIG. 1A is a block diagram of a power switching topology according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power inverters are used to convert DC power to AC power. Such inverters include power switching circuitry that can experience switching losses proportional to voltage. For example, power inverters are typically most efficient in low-voltage applications due to increased switching losses at medium- and high-voltages. In some examples, medium- and high-voltage applications are also subject to higher switching speeds which can reduce the output power capability of the power inverter. In addition, the use of high-voltage switches in power switching circuitry can lead to increased costs.

More efficient multi-level inverter topologies for use in medium- and high-voltage power switching applications are provided herein. In at least one embodiment, a first conversion stage generates variable DC voltages from input DC voltages and a second conversion stage derives a plurality of AC output signals from the variable DC voltages. In some examples, the variable DC voltages are provided using multi-level DC/DC converters and the AC outputs are derived using a DC/AC inverter. Such topologies may provide improved efficiency in medium- and high-voltage power switching applications, and in some examples, efficiency and power density may be improved along with reductions in cost.

FIG. 1A illustrates a functional block diagram of one embodiment of a power switching topology 100 in accordance with aspects described herein. The power switching topology 100 includes a first DC/DC converter 102, a second DC/DC converter 104, a DC/AC inverter 106, a first DC voltage source 108, a second DC voltage source 110, a positive DC input 112, a midpoint 114, a negative DC input 116, and an AC output 118. In some embodiments, the power switching topology 100 can include more than two DC/DC converters. Likewise, the power switching topology 100 can include more than two DC voltage sources.

As shown in FIG. 1A, the DC/AC inverter 106 is coupled to the first and second DC/DC converters 102, 104 and configured to receive DC outputs from the first and second DC/DC converters 102, 104. The DC/AC inverter 106 converts the DC outputs received from the first and second DC/DC converters 102, 104 into a plurality of AC output signals and provides the plurality of output AC signals to the AC output 118. In certain examples, the AC output 118 can include a plurality of AC outputs.

In one example, the first DC voltage source 108 is coupled between the positive DC input 112 and the midpoint 114 and the second DC voltage source 110 is coupled between the midpoint 114 and the negative DC input 116. In some examples, the midpoint 114 is coupled to ground (i.e., zero volts). In some examples, the DC/AC inverter 106 is also coupled to the midpoint 114.

An input DC voltage VDC can be split across the first DC voltage source 108 and the second DC voltage source 110. In certain examples, the input DC voltage VDC may be split evenly between the first and second DC voltage sources 108, 110. By splitting the input DC voltage VDC across the first and second DC voltage sources 108, 110, the first and second DC/DC converters 102, 104 may be configured to support a portion of the input DC voltage VDC (e.g., 50%). For example, as shown in FIG. 1A, the first DC/DC converter 102 is coupled to the first DC voltage source 108 and to receive a first DC voltage VD1 (e.g., a first portion of VDC) from the first DC voltage source 108. Likewise, the second DC/DC converter 104 is coupled to the second DC voltage source 110 and to receive a second DC voltage VD2 (e.g., a second portion of VDC) from the second DC voltage source 110.

In some examples, the DC voltage sources 108, 110 each include one or more capacitors coupled in series. For example, the first DC voltage source 108 can include a plurality of capacitors coupled in series between the positive DC input 112 and the midpoint 114, and the second DC voltage source 110 can include a plurality of capacitors coupled between negative DC input 116 and the midpoint 114. In some examples, the first DC/DC converter 102 includes a first input and a second input coupled across the plurality of capacitors of the first DC voltage source 108 to receive the first DC voltage VD1. Likewise, the second DC/DC converter 104 includes a first input and a second input coupled across the plurality of capacitors of the second DC voltage source 110 to receive the second DC voltage VD2.

In certain examples, the first and second DC/DC converters 102, 104 may include additional inputs coupled to the first and second DC voltage sources 108, 110. For example, the first DC/DC converter 102 can include one or more additional inputs coupled between the plurality of capacitors of the first DC voltage source 108 to receive additional DC voltages from the first DC voltage source 108; i.e., different portions of the first DC voltage VD1. Likewise, the second DC/DC converter 104 can include one or more additional inputs coupled between the plurality of capacitors of the second DC voltage source 110 to receive additional DC voltages from the second DC voltage source 110; i.e., different portions of the second DC voltage VD2. In some examples, other types and arrangements of DC voltage sources may be used.

In some examples, the power switching topology 100 can include additional circuitry to maintain a desired voltage distribution between the first DC voltage source 108 and the second DC voltage source 110. For example, FIG. 1B illustrates a functional block diagram of a power switching topology 120. The power switching topology 120 is substantially similar to the power switching circuit 100 of FIG. 1A, except the power switching topology 120 includes a DC bus balancer 122. As shown, the DC bus balancer 122 can be coupled to the positive DC input 112, the midpoint 114, and the negative DC input 116, and include one or more DC/DC converters configured to regulate the first and second DC voltages VD1, VD2. In some examples, the DC bus balancer 122 is operated to maintain an equal distribution of the input DC voltage VDC across each of the DC voltage sources 108, 110. In other examples, the DC bus balancer 122 is operated to maintain a different distribution of the input DC voltage VDC across the DC voltage sources 108, 110.

Figure 1C:
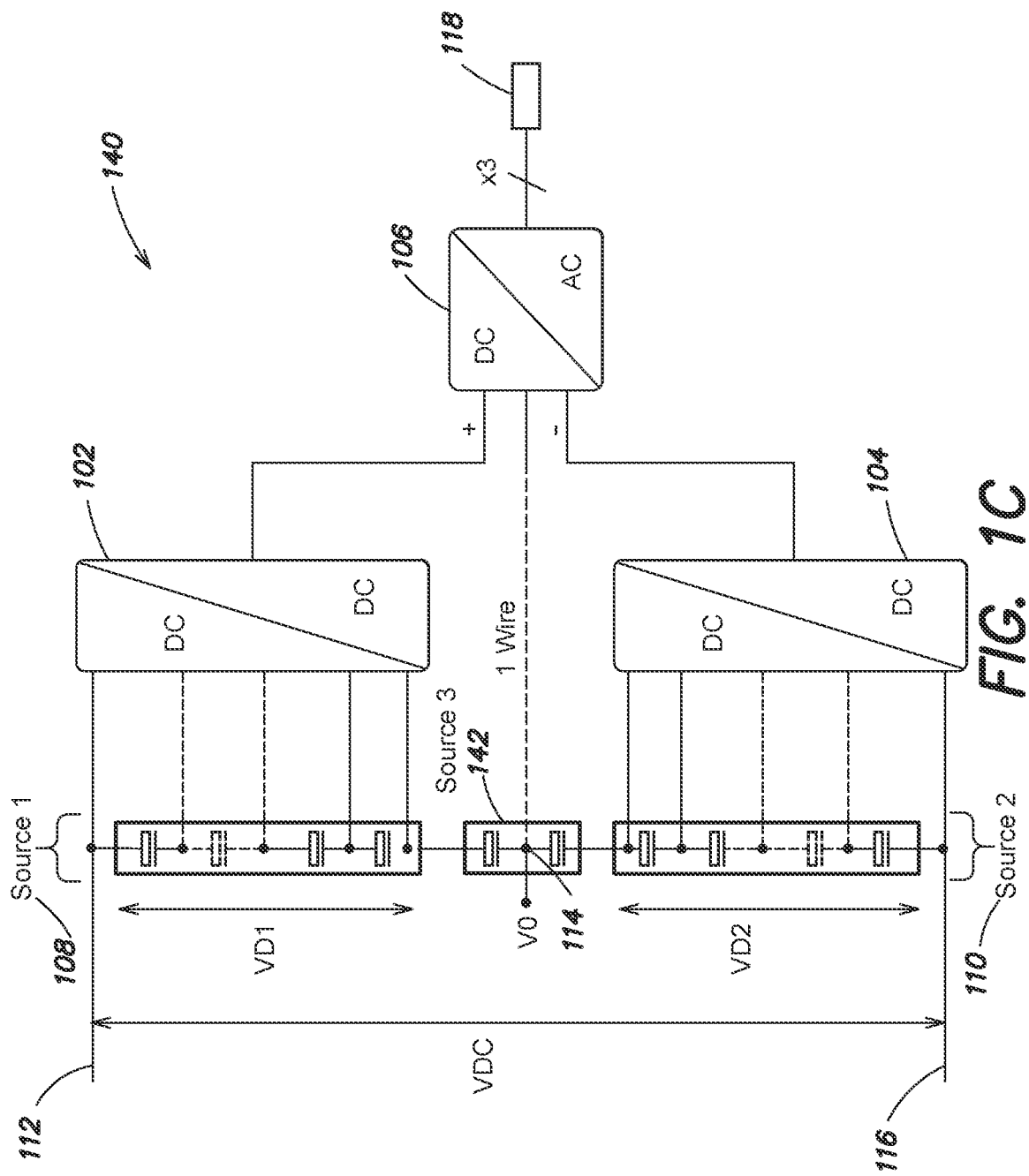
FIG. 1C is a block diagram of a power switching topology according to aspects described herein.

As described above, the power switching topology 100 can include more than two DC voltage sources. In certain examples, additional DC voltage sources may be included to optimize the voltage distribution between the first and second DC voltage sources 108, 110. For example, FIG. 1C illustrates a functional block diagram of a power switching circuit 140 in accordance with aspects described herein. The power switching topology 140 is substantially similar to the power switching topology 100 of FIG. 1A, except the power switching circuit 150 includes a third DC voltage source 142. As shown in FIG. 1C, the third DC voltage source 142 is coupled between the first DC voltage source 108 and the second DC voltage source 110. In some examples, the third DC voltage source 142 is configured to store an intermediate portion of the input DC voltage VDC. For example, the first DC/DC converter 102 can be configured to receive a first upper portion (e.g., highest 30%) of the input DC voltage VDC and the second DC/DC converter 102 can be configured to receive a second lower portion (e.g., lowest 30%) of the input DC voltage VDC. As such, the third DC voltage source 142 can be configured to store the intermediate portion (e.g., middle 40%) of the input DC voltage VDC.

Figure 1D:
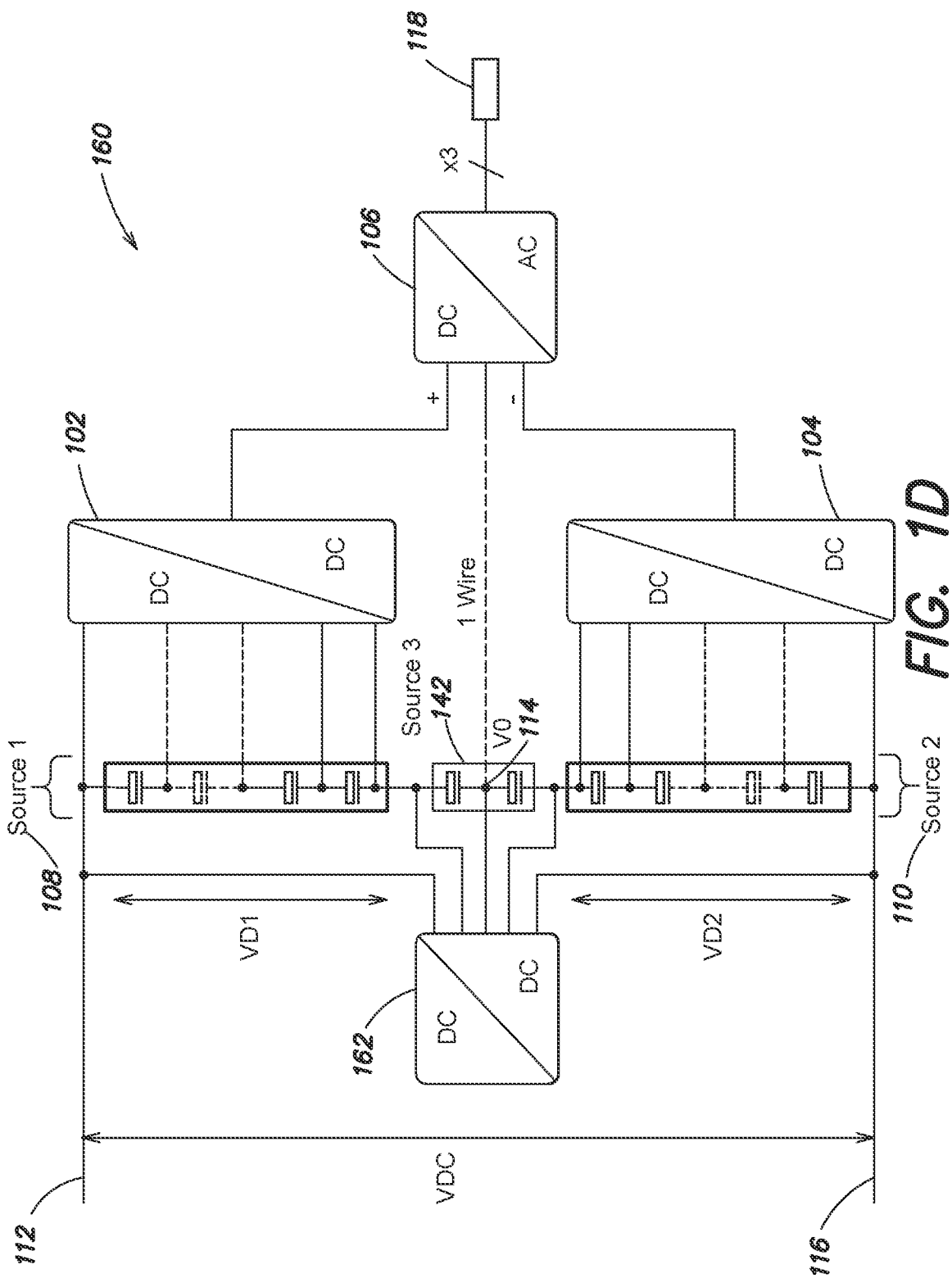
FIG. 1D is a block diagram of a power switching topology according to aspects described herein.

In some examples, the power switching topology 140 includes additional circuitry to maintain a desired voltage distribution between the first, second, and third DC voltage sources 108, 110, 142. For example, FIG. 1D illustrates a functional block diagram of a power switching topology 160 in accordance with aspects described herein. The power switching topology 160 is substantially similar to the power switching topology 140 of FIG. 1C, except the power switching topology 160 includes a DC bus balancer 162. In some examples, the DC bus balancer is coupled across the first voltage source 108, the second voltage source 110, and the third voltage source 142 and includes one or more DC/DC converters configured to regulate the first and second DC voltages VD1, VD2, as well as the intermediate voltage across the third DC voltage source 142. As discussed above, in some examples the desired voltage distribution may be an unequal distribution across the DC voltage sources 108, 110, 142; however, in other examples, the desired distribution may be an equal distribution across the DC voltage sources 108, 110, 142.

Figure 2A:
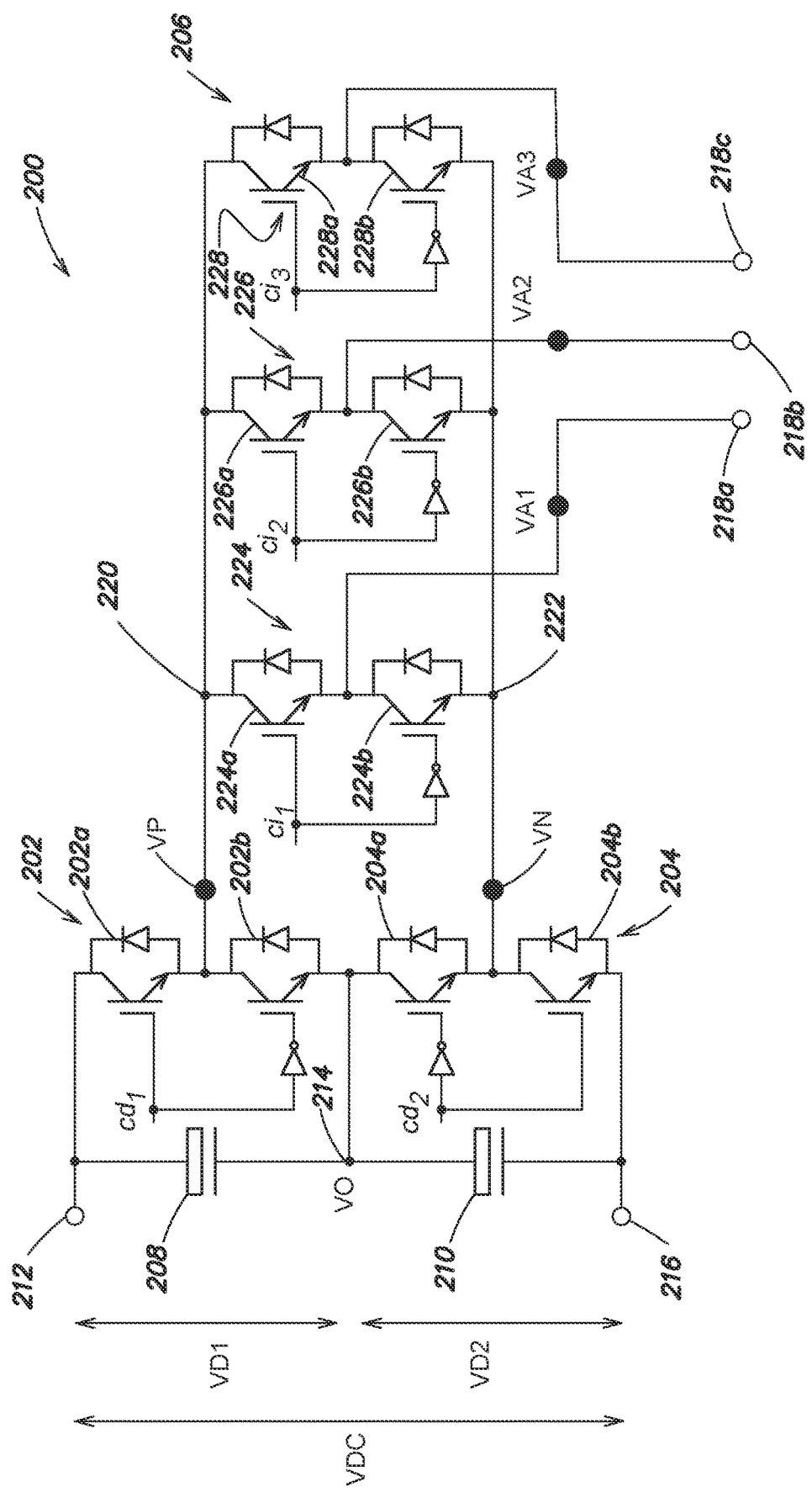
FIG. 2A is a schematic diagram of a power switching circuit according to aspects described herein.

FIG. 2A illustrates a schematic of a power switching circuit 200 in accordance with aspects described herein. In one example, the power switching circuit 200 corresponds to the power switching topology 100 of FIG. 1A; however, in other examples, features corresponding to the power switching topologies 120, 140, and 160 of FIGS. 1B-1D can be included in the power switching circuit 200. As shown, the power switching circuit 200 includes a first DC/DC converter 202, a second DC/DC converter 204, a DC/AC inverter 206, a first DC voltage source 208, a second DC voltage source 210, a first DC input 212, a midpoint 214, and a second DC input 216.

The first DC voltage source 208 is coupled between the first DC input 212 and the midpoint 214, and the first DC/DC converter 202 is coupled across the first DC voltage source 208. In some examples, the first DC input 212 is a positive DC input. Likewise, the second DC voltage source 210 is coupled between the second DC input 216 and the midpoint 214, and the second DC/DC converter 204 is coupled across the second DC voltage source 210. In some examples, the second DC input 216 is a negative DC input.

In one example, an input DC voltage VDC can be split across the first and second DC voltage sources 208, 210. As such, the first DC voltage source 208 is configured to provide a first DC voltage VD1 and the second DC voltage source 210 is configured to provide a second DC voltage VD2. In some examples, the first and second DC voltage sources 208, 210 can each include one or more capacitors coupled in series. In other examples, a third DC voltage source and/or a bus balancer may be included as described above (e.g., power switching topologies 120, 140, 160).

In some examples, the DC/DC converters can each include m switching cells. For example, a switching cell of the first DC/DC converter 202 includes a first switch 202a and a second switch 202b. The first switch 202a is coupled to a first side of the first DC voltage source 208 (e.g., the first DC input 212) and the second switch 202b is coupled to a second side of the first DC voltage source 208 (e.g., the midpoint 214). In other examples, the first and second switches 202a, 202b can be arranged differently. In some examples, the first and second switches 202a, 202b are configured to operate in a complementary manner. For example, when the first switch 202a is turned on (i.e., closed), the second switch 202b is turned off (i.e., opened), and vice versa. As shown in FIG. 2A, the first switch 202a is configured to receive a control signal $cd_1$ and the second switch 202b is configured to receive an inverted version of the control signal $cd_1$. In other examples, the first and second switches 202a, 202b can each receive independent control signals.

Likewise, a switching cell of the second DC/DC converter 204 includes a first switch 204a and a second switch 204b. The first switch 204a is coupled to a first side of the second DC voltage source 210 (e.g., the midpoint 214) and the second switch 204b is coupled to a second side of the second DC voltage source 210 (e.g., the second DC input 216). In other examples, the first and second switches 204a, 204b can be arranged differently. In one example, the first and second switches 204a, 204b are configured to a complementary manner. As shown in FIG. 2A, the second switch 204b is configured to receive a control signal $cd_2$ and the first switch 204a is configured to receive an inverted version of the control signal $cd_2$. In other examples, the first and second switches 204a, 204b can each receive independent control signals.

It should be appreciated that the DC/DC converters 202, 204 are merely described as having a single switching cell (i.e., m=1) for illustrative purposes and are not limited to single switching cell configurations. In other embodiments, the DC/DC converters 202, 204 can each be configured to include two or more switching cells (i.e., m>1). Examples of such embodiments are described in greater detail below (e.g., FIG. 5).

In one example, the first DC/DC converter 202 is operated to convert the first DC voltage VD1 provided by the first DC voltage source 208 into a variable DC voltage VP. Likewise, the second DC/DC converter 204 is operated to convert the second DC voltage VD2 provided by the second DC voltage source 210 into a variable DC voltage VN. As shown in FIG. 2A, the first DC/DC converter 202 can provide the variable DC voltage VP to a first DC output 220 and the second DC/DC converter can provide the variable DC voltage VN to a second DC output 222. In some examples, being that the DC/DC converters 202, 204 are only converting portions of the input DC voltage VDC (e.g., VD1, VD2) and not the full input DC voltage VDC, the DC/DC converters 202, 204 can operate at high switching frequencies with reduced switching losses.

Figure 2B:
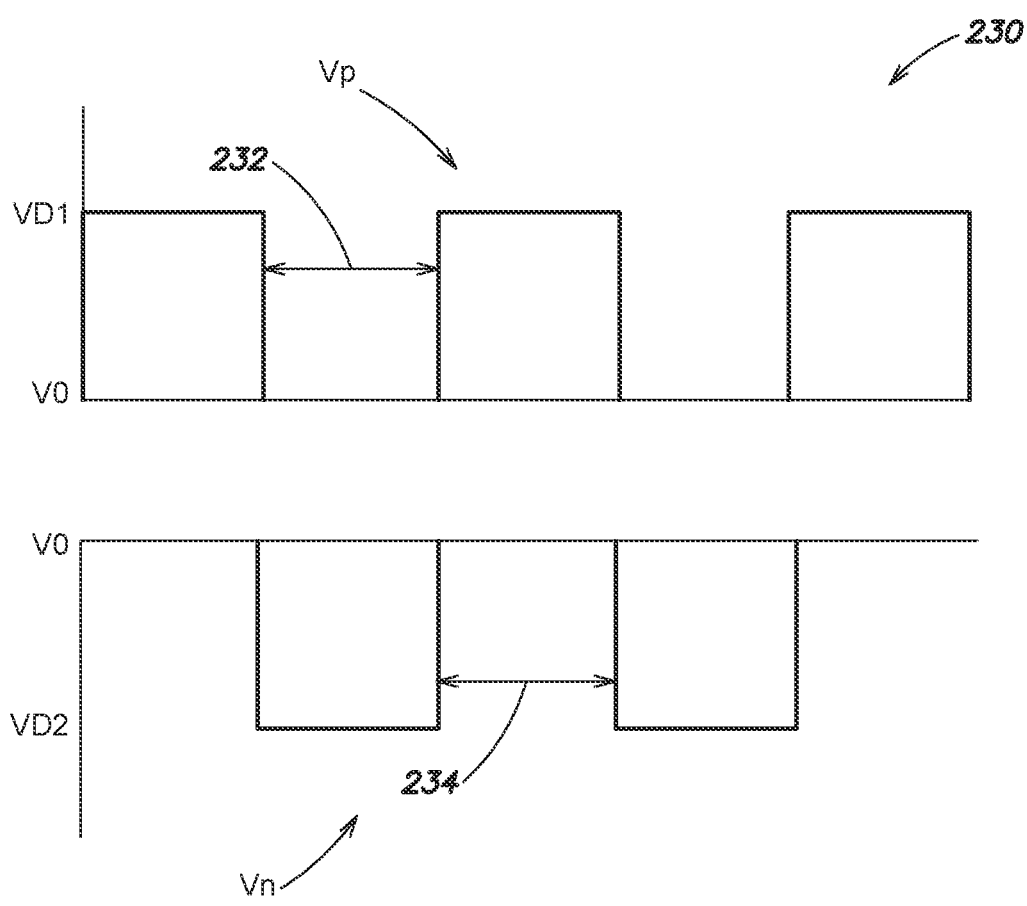
FIG. 2B is a graph illustrating examples of a power switching voltages according to aspects described herein.

FIG. 2B illustrates an example of the variable DC voltages VP and VN according to aspects described herein. In one example, the first DC/DC converter 202 is operated such that the variable DC voltage VP oscillates between the first DC voltage VD1 and the midpoint voltage V0, and the second DC/DC converter 204 is operated such that variable DC voltage VN oscillates between the midpoint voltage V0 and the second DC voltage VD2. As shown, VP has a first duty cycle 232 and VN has a second duty cycle 234. In one example, the duty cycles 232, 234 are substantially the same; however, in other examples the duty cycles 232, 234 may be different (e.g., adjusted by the controls signals $cd_1$ and $cd_2$).

In some examples, the first and second DC/DC converters 202, 204 can be operated as DC choppers. As such, the variable DC voltages VP and VN can each have substantially square (i.e., chopped) waveforms. In some examples, since the variable DC voltages VP and VN have chopped waveforms, the first and second DC outputs 220, 222 of the DC/DC converters 202, 204 can be coupled directly to the DC/AC inverter 206 (i.e., without filtering elements).

The DC/AC inverter 206 can include n switching legs. As shown in FIG. 2A, the DC/AC inverter 206 includes a first switching leg 224, a second switch leg 226, and a third switching leg 228 (i.e., n=3). In other examples, the DC/AC inverter 206 may have a different number of switching legs, with n being greater than two.

In one example, each switching leg of the DC/AC inverter 206 includes k switching cells coupled between the first DC output 220 of the first DC/DC converter 202 and the second DC output 222 of the second DC/DC converter 204. For example, a switching cell of the first switching leg 224 includes a first switch 224a and a second switch 224b coupled between the first DC output 220 and the second DC output 222. The first switch 224a is coupled between the first DC output 220 and a first AC output 218a and the second switch 224b is coupled between the second DC output 222 and the first AC output 218a. Likewise, a switching cell of the second switching leg 226 includes a first switch 226a coupled between the first DC output 220 and a second AC output 218b and a second switch 226b coupled between the second DC output 222 and the second AC output 218b. Similarly, a switching cell of the third switching leg 228 includes a first switch 228a coupled between the first DC output 220 and a third AC output 218c and a second switch 228b coupled between the second DC output 222 and the third AC output 218c. In other examples, the switching cell(s) of each switching leg may be arranged differently.

In some examples, the first and second switches of each switching cell are configured to operate in a complementary manner. For example, when the first switch is turned on (i.e., closed), the second switch is turned off (i.e., opened), and vice versa. In some examples, each switching leg is operated in a first state by turning on the first switch and turning off the second switch such that the variable DC voltage VP is provided to the corresponding AC output (i.e., 218a, 218b, or 218c). Likewise, each switching leg is operated in a second state by turning off the first switch and turning on the second switch such that the variable DC voltage VN is provided to the corresponding AC output (i.e., 218a, 218b, or 218c).

As shown in FIG. 2A, each switching leg 224, 226, 228 can be controlled to operate in the first and second states via control signals. For example, the switching cell of the first switching leg 224 is configured to receive a control signal $ci_1$. The first switch 224a of the switching cell receives the control signal $ci_1$ and the second switch 224b of the switching cell receives an inverted version of the control signal $ci_1$. The switching cells of the second and third switching legs 226, 228 are configured to receive corresponding control signals $ci_2$ and $ci_3$ in a similar manner. In other examples, the first and second switches of the switching cells of each switching leg 224, 226, 228 can receive independent control signals.

In one example, each switching leg 224, 226, 228 is operated in static and transition modes of operation to provide a plurality of output signals to the plurality of AC outputs 218. In some examples, the static mode of each switching leg corresponds to the first and second states described above. Likewise, the transition mode of each switching leg corresponds to a transition between the first and second states. As such, while operating in the static mode, each switching leg can provide either the variable DC voltage VP or the variable DC voltage VN to its corresponding AC output (i.e., 218a, 218b, or 218c). In some examples, each switching leg is operated in the static mode to provide the most positive and negative portions of the plurality of output signals. Similarly, while operating in the transition mode, each switching leg can provide at least a portion of the variable DC voltage VP and/or the variable DC voltage VN to its corresponding AC output (i.e., 218a, 218b, or 218c). In one example, each switching leg is operated in the transition mode to provide intermediate portions of the plurality of output signals. In certain examples, the switching legs can be controlled to cycle through the static and transition modes such that the synthesized plurality of output signals provided to the AC outputs 218a, 218b, 218c have phase offsets.

It should be appreciated that the DC/AC inverter 206 of the power switching circuit 200 is merely described as having three switching legs with single switching cells (i.e., n=3, k=1) for illustrative purposes and is limited to this specific configuration. In other embodiments, the DC/AC inverter 206 can be configured to include a different number of switching legs and/or a different number of switching cells. Examples of such embodiments are described in greater detail below (e.g., FIG. 7A).

FIG. 2C is a graph illustrating control signal waveforms for operating the power switching circuit 200 in accordance with aspects described herein. As described above, the first DC/DC converter 202 is operated to convert the first DC voltage VD1 provided by the first DC voltage source 208 into the variable DC voltage VP and the second DC/DC converter 204 is operated to convert the second DC voltage VD2 provided by the second DC voltage source 210 into the variable DC voltage VN. In one example, the control signal $cd_1$ is oscillated to toggle the switches 202a, 202b of the switching cell of the first DC/DC converter 202 on and off to derive the variable DC voltage VP from the first DC voltage VD1. Likewise, the control signal $cd_2$ is oscillated to toggle the switches 204a, 204b of the switching cell of the second DC/DC converter 204 on and off to derive the variable DC voltage VN from the second DC voltage VD2.

As shown in FIG. 2C, the control signals $cd_1$ and $cd_2$ can be offset in time. For example, the control signals $cd_1$ and $cd_2$ can be offset such that the first and second DC/DC converters 202, 204 are operated to provide offsetting variable DC voltages VP and VN (as shown in FIG. 2B). In some examples, the control signals $cd_1$ and $cd_2$ are pulse width modulation (PWM) signals. In other examples, the control signals $cd_1$ and $cd_2$ may be arranged or aligned differently.

As described above, the DC/AC inverter 206 is operated to provide the plurality of output signals to the plurality of AC outputs 218. In some examples, the control signals $ci_1$-$ci_3$ can be oscillated to cycle each of the switching legs 224, 226, 228 through the static and transition modes of operation to derive the plurality of output signals from the variable DC voltages VP and VN. For example, when each of the control signals $ci_1$-$ci_3$ is high (e.g., 1), the corresponding switching leg is operated in the first state (i.e., static mode) to provide the variable DC voltage VP to its respective AC output (i.e., 218a, 218b, or 218c). Similarly, when each of the control signals $ci_1$-$ci_3$ is low (e.g., 0), the corresponding switching leg is operated in the second state (i.e., static mode) to provide the variable DC voltage VN to its respective AC output. Likewise, when each of the control signals $ci_1$-$ci_3$ is transitioning between high/low (i.e., transition mode), the corresponding switching leg provides at least a portion of the variable DC voltages VP and VN to its respective AC output.

As shown in FIG. 2C, the DC/AC inverter 206 can be operated such that only one of the switching legs 224, 226, 228 is operated in the transition mode of operation and the remaining switching legs are operated in the static mode of operation at any given time. For example, during a first time period T1, the first switching leg 224 is controlled by the control signal $ci_1$ to operate in the first state (i.e., static mode) to derive the most positive portion of its corresponding output signal from the variable DC voltage VP and the second switching leg 226 is controlled by the control signal $ci_2$ to operate in the second state (i.e., static mode) to derive the most negative portion of its corresponding output signal from the variable DC voltage VN. At the same time, the third switching leg 228 is controlled by the control signal $ci_3$ to switch from the first state to the second state (i.e., transition mode). As such, during the first time period T1, the third switching leg 228 derives an intermediate portion of its corresponding output signal from the variable DC voltages VP and VN.

Likewise, during a second time period T2, the first switching leg 224 is controlled by the control signal $ci_1$ to remain operating in the first state (i.e., static mode) and continue deriving the most positive portion of its corresponding output signal from the variable DC voltage VP. The third switching leg 228 is controlled by the control signal $ci_3$ to operate in the second state (i.e., static mode) to derive the most negative portion of its corresponding output signal from the variable DC voltage VN. At the same time, the second switching leg 226 is controlled by the control signal $ci_2$ to switch from the second state to the first state (i.e., transition mode). As such, during the second time period T2, the second switching leg 226 derives an intermediate portion of its corresponding output signal from the variable DC voltages VP and VN. As shown in FIG. 2C, the switching legs 224, 226, 228 can be continually cycled by the control signals $ci_1$-$ci_3$ through the static and transition modes during time periods T3-T5 (and so on) to derive the plurality of output signals from the variable DC voltages VP and VN.

In one example, being that only one switching leg of the DC/AC inverter 206 is transitioned between the first and second states at a time (i.e., operating in the transition mode), switching losses can be reduced, improving the efficiency of the DC/AC inverter 206. In some examples, being that the variable DC voltages VP and VN have chopped waveforms with zero voltage periods, switching losses in the DC/AC inverter 206 and the power switching circuit 200 can be reduced even further.

In addition, VP has a peak amplitude that is substantially equal to the first DC voltage VD1 and VN has a peak amplitude that is substantially equal to the second DC voltage VD2. As such, the DC/AC inverter 206 can be operated to minimize the amplitude of the differential voltage between the variable DC voltages VP and VN (e.g., by staggering the zero voltage periods). In some examples, by minimizing the amplitude of the differential voltage between the variable DC voltages VP and VN, stress on the DC/AC inverter 206 can be reduced while deriving the plurality of output signals.

As described above, it may be desired for the plurality of output signals to have phase offsets. In some examples, the control signals $cd_1$ and $cd_2$ can be oscillated at a frequency different than the frequency of the plurality of output signals. For example, the control signals $cd_1$ and $cd_2$ can be oscillated at a frequency faster than the plurality of output signals. As such, the control signals $ci_1$-$ci_3$ of the DC/AC inverter 206 can be aligned relative to the control signals $cd_1$ and $cd_2$ of the DC/DC converters 202, 204 to provide desired phase offsets between the plurality of output signals. As shown in FIG. 2C, the control signals $ci_1$-$ci_3$ can be staggered across cycles of the control signals $cd_1$ and $cd_2$ to generate the desired phase offsets between the plurality of output signals.

In addition, the control signals $cd_1$ and $cd_2$ can be offset/staggered such that switching legs operating in the transition mode can be coupled/decoupled between the first DC output 220 and the second DC output 222 during zero voltage periods of the variable DC voltages VP and VN (i.e., when VP and VN are providing V0). For example, during the first time period T1, the third switching leg 228 is controlled by the control signal $ci_3$ to operate in the transition mode (first state to second state). Based on the alignment of the control signals $cd_1$ and $cd_2$, the third switching leg 228 is decoupled from the first DC output 220 while the variable DC voltage VP is providing V0 (as indicated by $cd_1$). Likewise, the third switching leg 228 is coupled to the second DC output 222 while the variable DC voltage VN is providing V0 (as indicated by $cd_2$).

In one example, by coupling/decoupling the switching legs between the first and second DC outputs 220, 222 while VP and VN are providing V0, switching losses of the DC/AC inverter 206 can be reduced. In some examples, the switching cell switches of each switching leg can be turned on/off while only a portion of the input DC voltage VDC is applied across each switching leg (i.e., VD1, VD2, or V0). As such, the power handling requirements of the switching legs (and cells) can be reduced to improve the efficiency of the DC/AC inverter 206. In certain examples, switching components rated for lower power applications can be utilized to reduce cost.

Figure 2D:
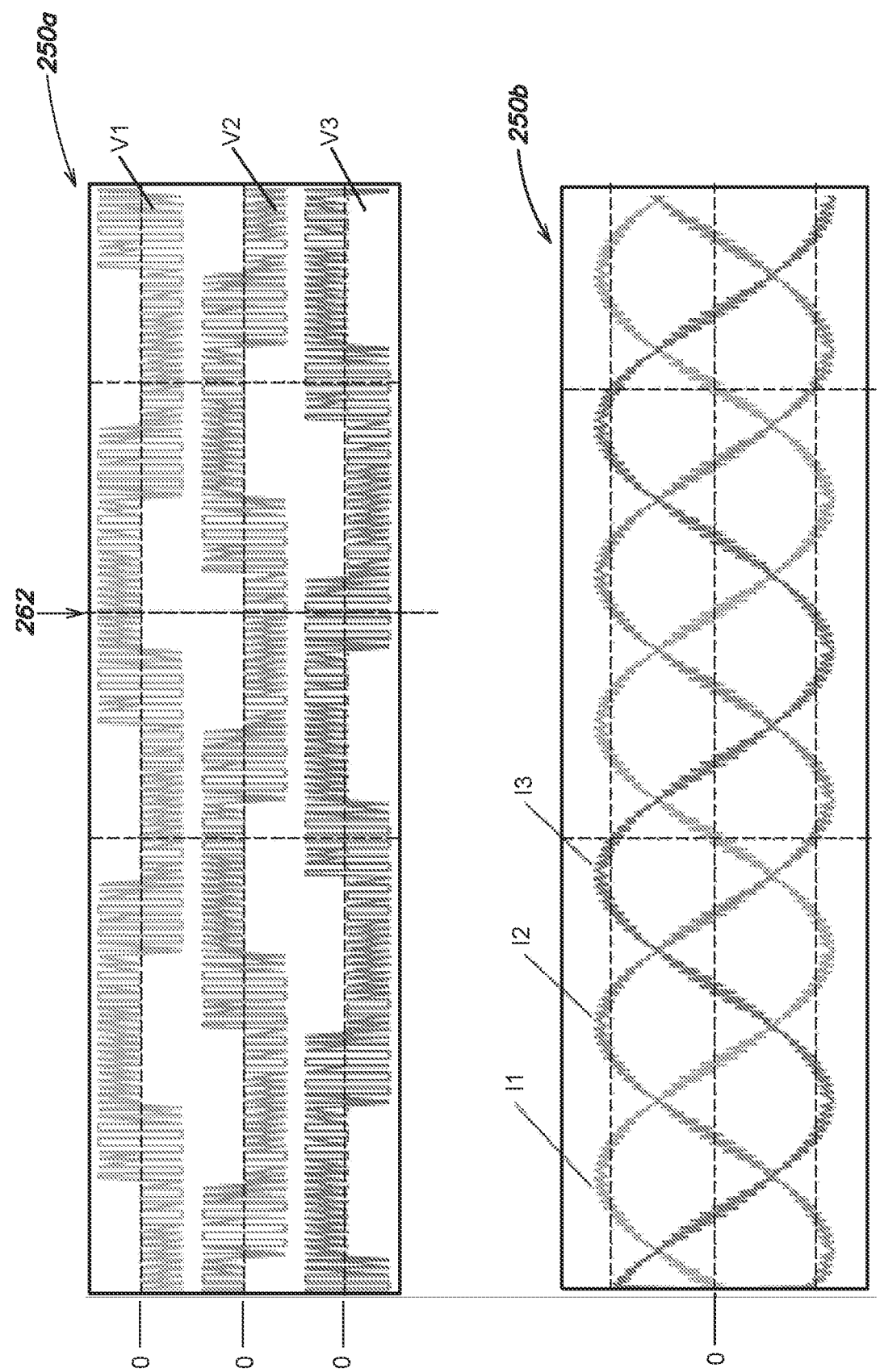
FIG. 2D is a graph illustrating examples of a power switching signals according to aspects described herein.

FIG. 2D illustrates a plurality of output signals of the power switching circuit 200 in accordance with aspects described herein. As shown in the graph 250a, a first output voltage V1 corresponds to the output signal provided by the first switching leg 224 to the first AC output 218a, a second output voltage V2 corresponds to the output signal provided by the second switching leg 226 to the second AC output 218b, and a third output voltage V3 corresponds to the output signal provided by the third switching leg 228 to the third AC output 218c. In one example, being that each of the AC voltages V1-V3 are derived from the variable DC voltages VP and VN, each can oscillate between VD1 and VD2.

As described above, at any given time, only one of the switching legs 224, 226, 228 is operated in the transition mode and the remaining switching legs are operated in the static mode (i.e., first or second state). As such, only the output signal corresponding to the switching leg operating in the transition state may switch between VD1 and VD2 at any given time. For example, at time marker 262, the first switching leg 224 is operated in the static mode (first state), the second switching leg 226 is operated in the static mode (second state), and the third switching leg 228 is operated in the transition mode. As such, at time marker 262, the first switching leg 224 provides the most positive portion of the first output voltage V1, the second switching leg 226 provides the most negative portion of the second output voltage V2, and the third switching leg 228 provides the intermediate portion of the third output voltage V3.

The graph 260b illustrates an example of a first output current I1 associated with the first output voltage V1, a second output current I2 associated with the second output voltage V2, and a third output current I3 associated with the third output voltage V3. As described above and shown in FIG. 2D, the plurality of output signals can be phase offset from one another.

Figure 3A:
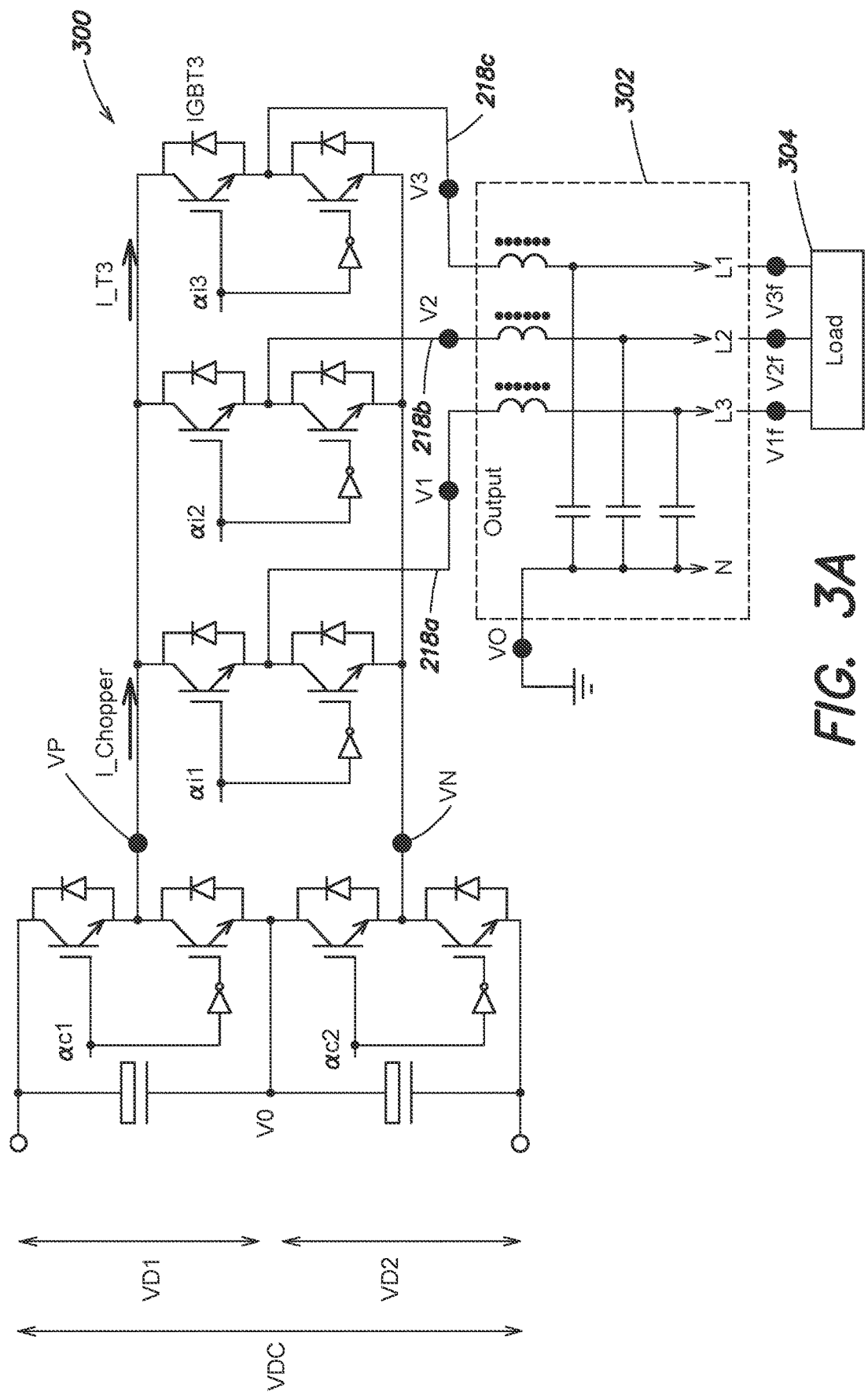
FIG. 3A is a schematic diagram of a power switching circuit according to aspects described herein.

In some examples, it may be desired for the plurality of output signals to be further conditioned depending on the power switching application. FIG. 3A illustrates a schematic of a power switching circuit 300 in accordance with aspects described herein. In one example, the power switching circuit 300 is substantially the same as the power switching circuit 200 of FIG. 2A, except the power switching circuit 300 includes a filter 302 coupled to the plurality of AC outputs 218a-218c to provide further conditioning of the plurality of output signals.

In some examples, the plurality of output signals V1-V3 (shown in FIG. 2D) may be subject to distortion resulting from operation (i.e., switching) of the DC/DC converters 202, 204 and the DC/AC inverter 206. In certain examples, the distortion corresponds to a third order harmonic of the switching frequency of the DC/DC converters 202, 204. In some examples, the filter 302 is a lowpass filter configured to remove high frequency distortion injected by the DC/DC converters 202, 204 and the DC/AC inverter 206. In one example, the filter 302 is an LC filter; however, in other examples, different types of filters can be used and configured to remove different types of distortion.

As shown in FIG. 3A, the filter 302 can provide a plurality of filtered output signals (e.g., V1f-V3f) to a load 304. In certain examples, the plurality of filtered output signals V1f-V3f can have a different waveform than the pre-filtered plurality of output signals. For example, the plurality of output signals may have a first waveform (e.g., square wave) and the filter 302 can be configured to provide a plurality of filtered output signals having a second waveform (e.g., sinusoidal).

Figure 3B:
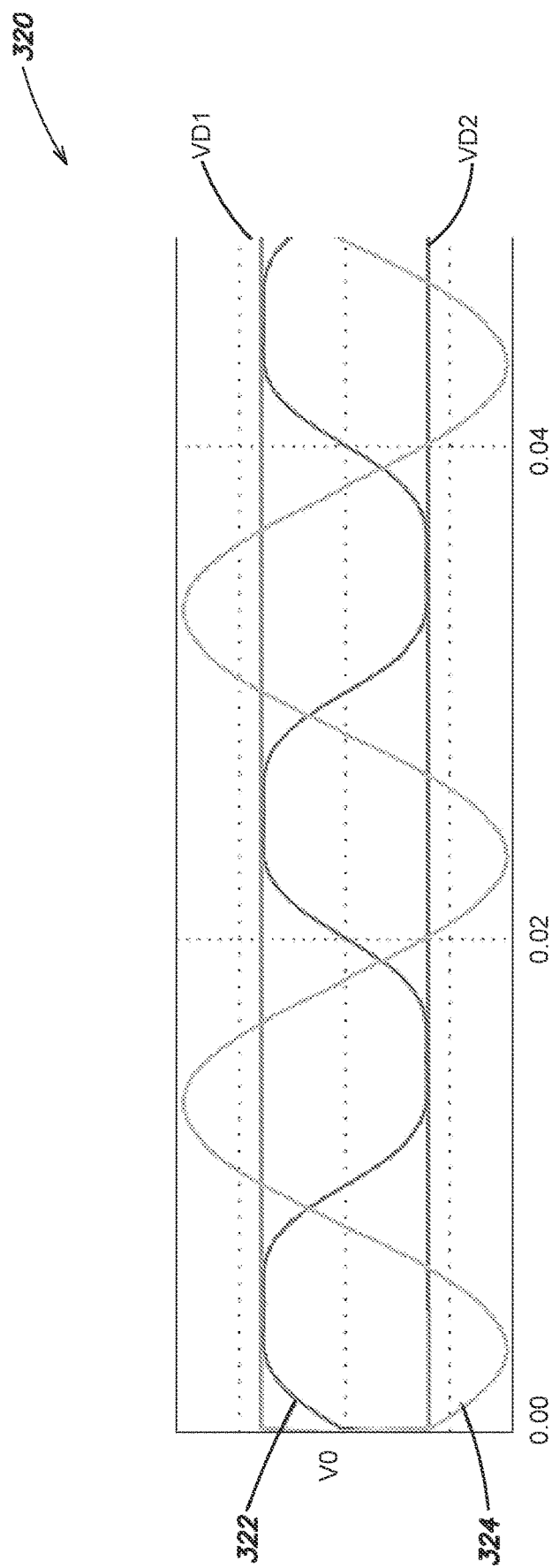
FIG. 3B is a graph illustrating examples of a power switching signals according to aspects described herein.

FIG. 3B illustrates a graph 320 of the filtered output voltages in accordance with aspects described herein. In one example, when referenced to V0, the filtered output voltages V1f-V3f can oscillate between VD1 and VD2. For example, the filtered output voltage 322 shown in the graph 320 corresponds to the first filtered output signal V1f when referenced to V0 (i.e., GND). As described above, the plurality of output signals can be phase offset from one another, and as such, can be referenced to one another to provide different variations of line output signals which oscillate above VD1 and below VD2. For example, the first and second filtered output voltages V1f and V2f can be referenced to one another to provide the line output voltage 324 shown in FIG. 3B.

In some examples, the amount of phase offset between each output signal of the plurality of output signals depends on the specific power switching application (i.e., the load 304). For example, in three-phase power applications, where the load 304 is an electrical grid or motor, the power switching circuit 300 can generate the plurality of output signals with phase offsets in increments of 120° to provide a desired plurality of line output signals (e.g., line output voltage 324).

As described above, it should be appreciated that embodiments described herein are not limited to particular types of DC/DC converters or DC/AC inverters. For example, the DC/DC converters 202, 204 of the power switching circuit 200 each include a single switching cell (m=1); however, in other examples, the DC/DC converters 202, 204 can include a different number of switching cells and/or a different converter topology. Similarly, the DC/AC inverter 206 of the power switching circuit 200 includes three switching legs 224, 226, 228 (n=3) having one switching cell each (k=1). However, in other examples, the DC/AC inverter 206 can include a different number of switching legs, a different number of switching cells per switching leg, and/or a different inverter topology.

In addition, while the DC/DC converters 202, 204 of the power switching circuit 200 are configured as two-level converters, in other examples, the DC/DC converters may be configured to provide more than two voltage levels. Likewise, while the DC/AC inverter 206 of the power switching circuit 200 is configured as a two-level inverter, in other examples, the DC/AC inverter 206 may be configured to operate with more than two voltage levels.

In some examples, the configurations of the DC/DC converters and the DC/AC inverter correspond to specific requirements of power switching applications. For example, in some power switching applications it may be desired to increase the output power capability of the DC/DC converters to support higher voltages.

Figure 4A:
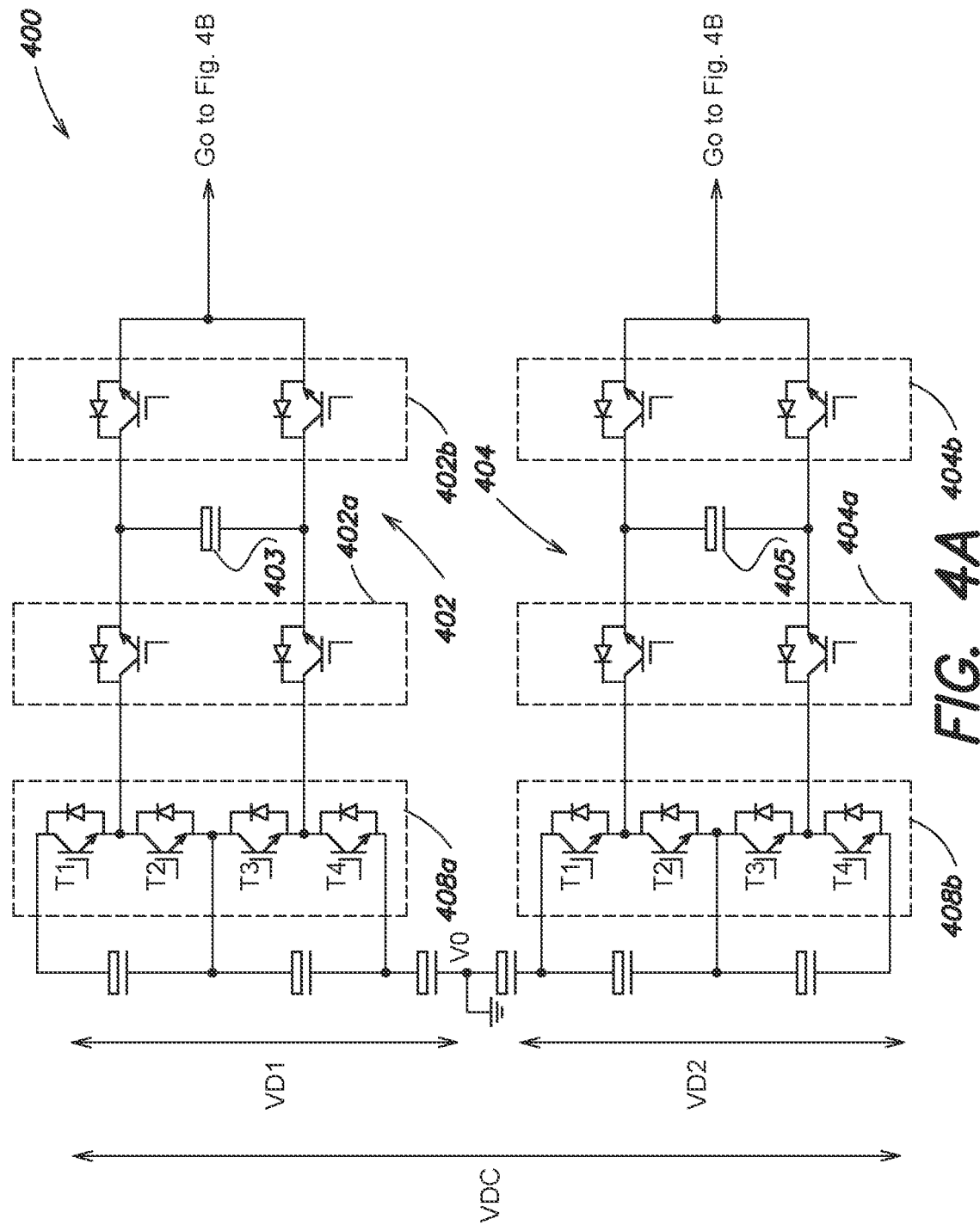
FIG. 4 is a schematic diagram of a power switching circuit according to aspects described herein.
Figure 4B:
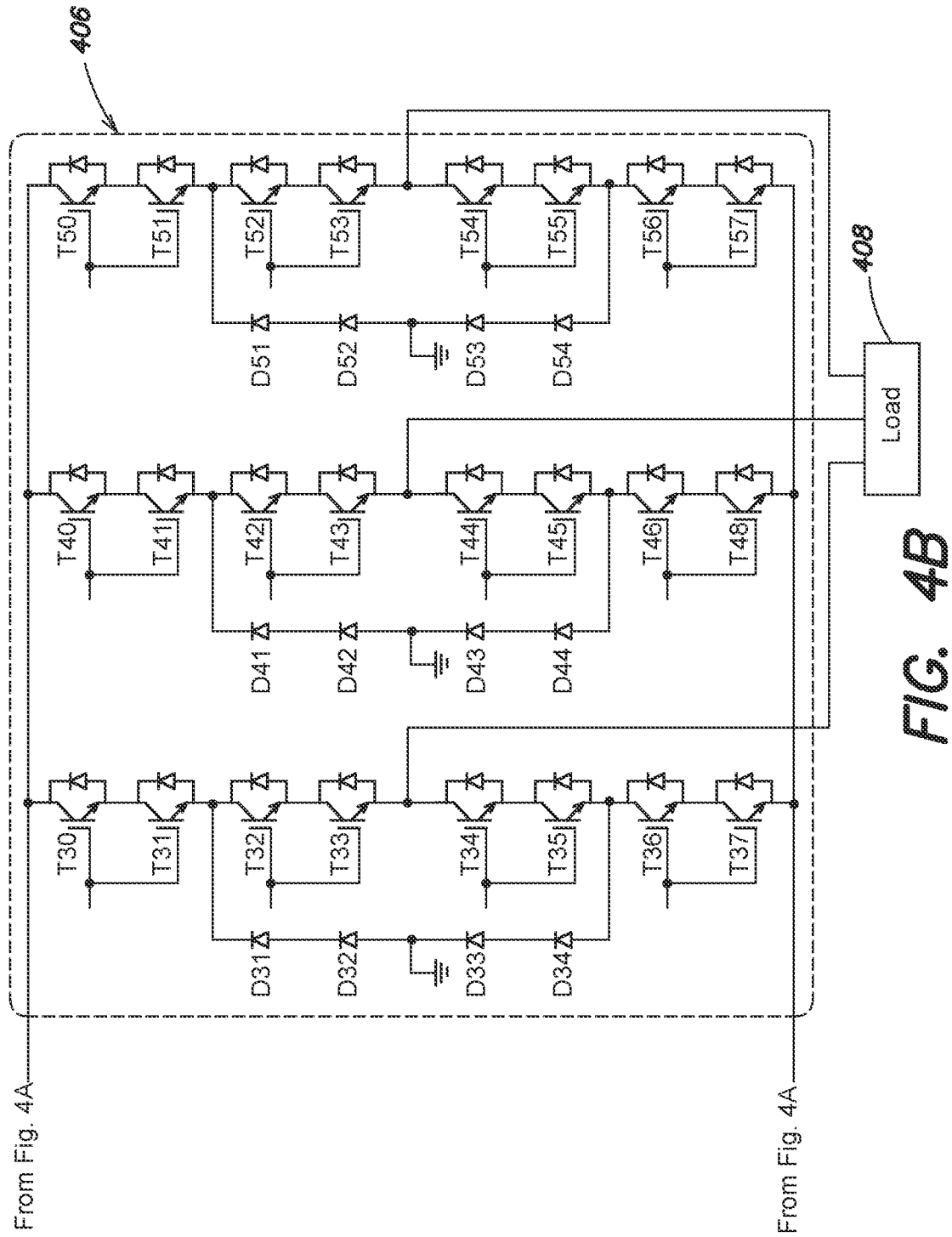

FIG. 4 illustrates a schematic of a power switching circuit 400 in accordance with aspects described herein. Similar to the power switching circuit 200 of FIG. 2A, the power switching circuit 400 includes a first DC/DC converter 402, a second DC/DC converter 404, and a DC/AC inverter 406.

In one example, the DC/DC converters 402, 404 each include multiple switching cells (i.e., m switching cells). In certain examples, increasing the number of switching cells (i.e., m) can improve the power handling capability of the DC/DC converters 402, 404. For example, the number of switching cells included in each DC/DC converter may correspond to the amplitude of the DC input voltage(s). In some examples, the inclusion of additional switching cells can improve the voltage distribution across switching cells and may allow for the voltage ratings of individual switches to be reduced. In the illustrated example, the DC/DC converters 402, 404 each include two switching cells (m=2) to provide increased output power capability of the power switching circuit 400. The first DC/DC converter 402 includes a first switching cell 402a and a second switching cell 402b. Likewise, the second DC/DC converter 404 includes a first switching cell 404a and a second switching cell 404b.

In certain examples, one or more capacitors can be coupled between the switching cells of each DC/DC converter 402, 404 to store portions of the DC voltages provided to the DC/DC converters 402, 404. In some examples, the number of capacitors included in each DC/DC converter 402, 404 corresponds to m−1. For example, being that the DC/DC converters 402, 404 each include two switching cells (m=2), the first DC/DC converter 402 can include a first capacitor 403 coupled between the first and second switching cells 402a, 402b and the second DC/DC converter 404 can include a second capacitor 405 coupled between the first and second switching cells 404a, 404b. The first capacitor 403 is configured to store at least a portion of the first DC voltage VD1 provided to the first DC/DC converter 402 and the second capacitor 405 is configured to store at least a portion of the second DC voltage VD2 provided to the second DC/DC converter 404.

In other embodiments, the DC/DC converters 402, 404 can include more than two switching cells (m>2), and capacitors can be coupled between second and third switching cells of each DC/DC converter in a similar manner, and so on. In such examples, the portions of the DC voltages (VD1, VD2) stored by each capacitor correspond to the number of switching cells in each DC/DC converter 402, 404 (i.e., m) and the amount of current drawn by each switching cell.

In some examples, the power switching circuit 400 can include DC voltage source selectors 408a and 408b to selectively provide various portions of the first and second DC voltages VD1, VD2 to the DC/DC converters 402, 404. (e.g., VD1/2, VD2/2, etc.). In one example, being that different portions of the first and second DC voltages VD1, VD2 can be provided to the DC/DC converters 402, 404, the DC/DC converters 402, 404 can be configured to provide more than two voltage levels. As such, the variable DC voltages generated by the DC/DC converters 402, 404 can oscillate between more than two voltage levels (e.g., V0, VD1/2, VD1, VD2/2, VD2, etc.). As shown in FIG. 4, the voltage selectors 408a, 408b can each include one or more switching cells that can be operated to provide the various DC voltages to the DC/DC converters 402, 404.

As shown in FIG. 4, the DC/AC inverter 406 includes three switching legs (n=3) having four switching cells each (k=2). In one example, the DC/AC inverter 406 is configured as three-phase Neutral Point Clamped (NPC) inverter. In some examples, the DC/AC inverter 406 is operated in a similar manner as to the DC/AC inverter 206 of the power switching circuit 200 of FIG. 2A. For example, at any given time the DC/AC inverter 406 can operate with one switching leg in a transition mode and the remaining switching legs in a static mode to provide a plurality of output signals to the load 408. In certain examples, the NPC inverter configuration provides the ability to support the variable DC voltages VP and VN using series coupled switches with reduced voltage ratings.

Figure 5:
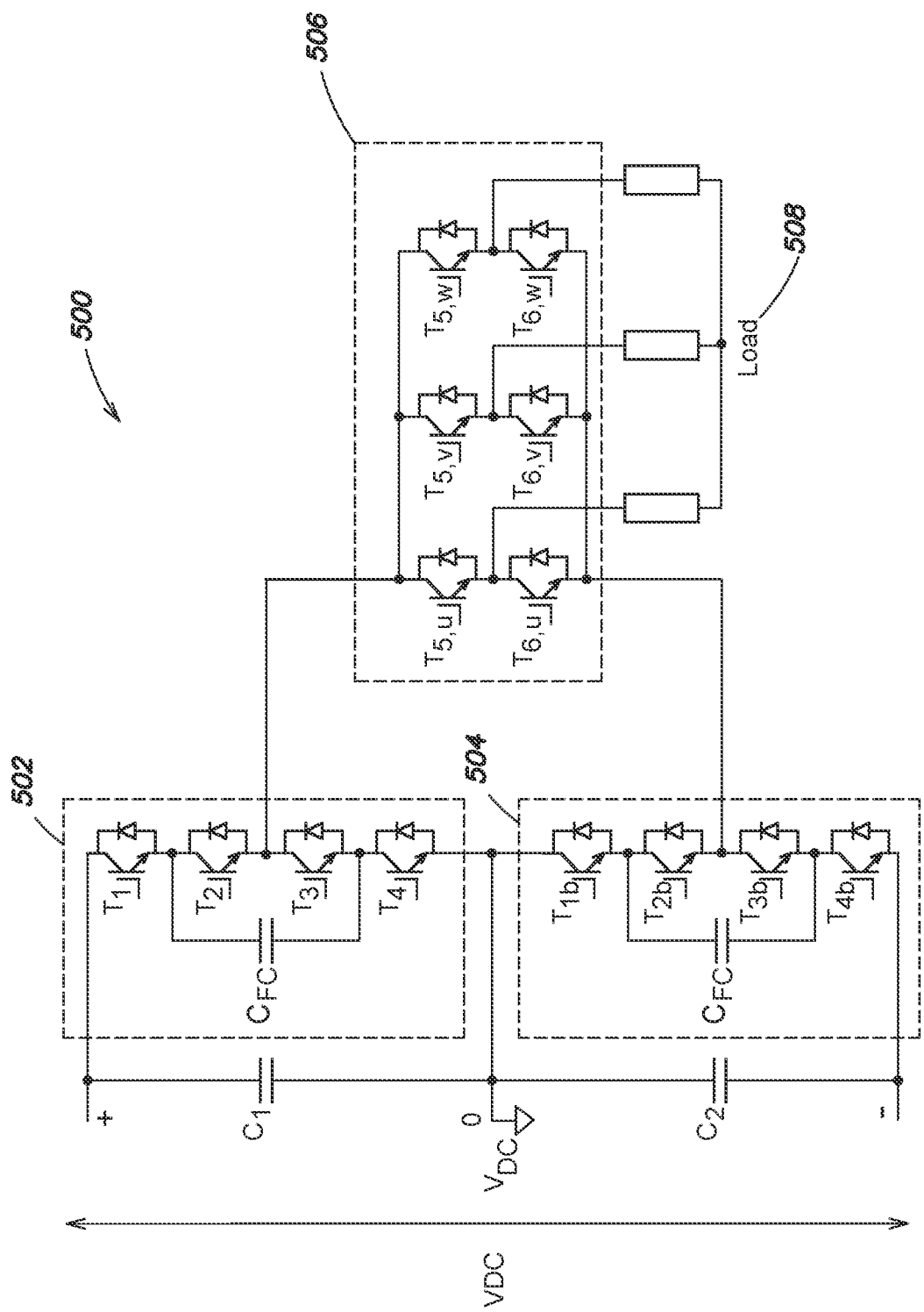
FIG. 5 is a schematic diagram of a power switching circuit according to aspects described herein.

FIG. 5 illustrates a schematic of a power switching circuit 500 in accordance with aspects described herein. Similar to the power switching circuit 200 of FIG. 2A, the power switching circuit 500 includes a first DC/DC converter 502, a second DC/DC converter 504, and a DC/AC inverter 506.

As shown, the DC/DC converters 502, 504 each include two switching cells (m=2). In one example, the DC/DC converters 502, 504 are configured as Flying Capacitor Multi-Level (FCML) converters. As such, the DC/DC converters 502, 504 can be operated as three-level converters. In some examples, the FCML configuration provides the ability to operate the switches of the DC/DC converters 502, 504 at reduced switching frequencies, as the apparent switching frequency is doubled at the output of each DC/DC converter 502, 504. As such, the DC/DC converters 502, 504 can be operated to provide reduced switching/conduction losses and lower harmonic distortion. In addition, being that the FCML configuration is isolated from the supply voltage midpoint (i.e., V0), the inclusion of a DC bus balancer may be optional.

In one example, the DC/AC inverter 506 includes three switching legs (n=3) each having one switching cell (k=1), similar to the DC/AC inverter 206 of the power switching circuit 200 of FIG. 2A. However, in other examples, the DC/AC inverter 506 can include a different number of switching legs, a different number of switching cells, and/or a different inverter topology.

In some examples, the power switching circuit 500 is operated in a similar manner as to the power switching circuit 200 of FIG. 2A. For example, the DC/DC converters 502, 504 can be operated to generate variable DC voltages from various portions of the input DC voltage VDC and the DC/AC inverter 506 can be operated to provide a plurality of output signals to the load 508.

Figure 6A:
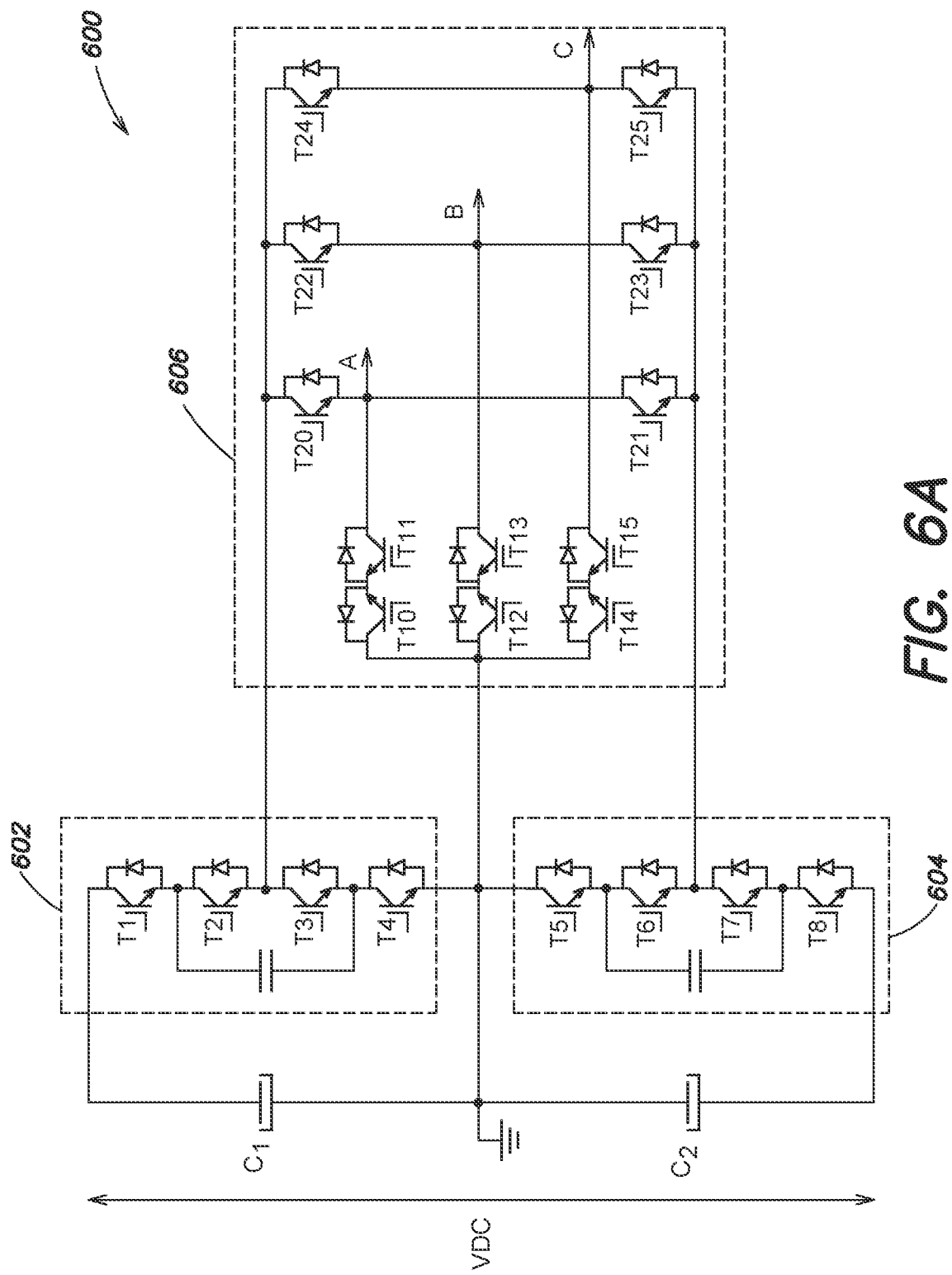
FIG. 6A is a schematic diagram of a power switching circuit according to aspects described herein.

FIG. 6A illustrates a schematic of a power switching circuit 600 in accordance with aspects described herein. Similar to the power switching circuit 200 of FIG. 2A, the power switching circuit 600 includes a first DC/DC converter 602, a second DC/DC converter 604, and a DC/AC inverter 606.

In one example, the DC/DC converters 602, 604 are configured as FCML converters similar to the DC/DC converters 502, 504 of the power switching circuit 500 of FIG. 5 (i.e., m=2). As shown, the DC/AC inverter 606 includes three switching legs (n=3) each having one switching cell (k=1). In some examples, the DC/AC inverter 606 is configured as a T-Type NPC (T-NPC) inverter. As such, the DC/AC inverter 606 can be operated as a three-level inverter configured to receive DC input voltages from the first DC/DC converter 602, the second DC/DC converter 604, and a midpoint/neutral connection. In some examples, the power switching circuit 600 can be operated in a similar manner as to the examples described above to provide a plurality of output signals. In certain examples, the T-NPC inverter configuration can be operated to provide the midpoint voltage (i.e., V0) to the inverter outputs (e.g., A, B, C) during transition states to reduce output voltage distortion.

Figure 6B:
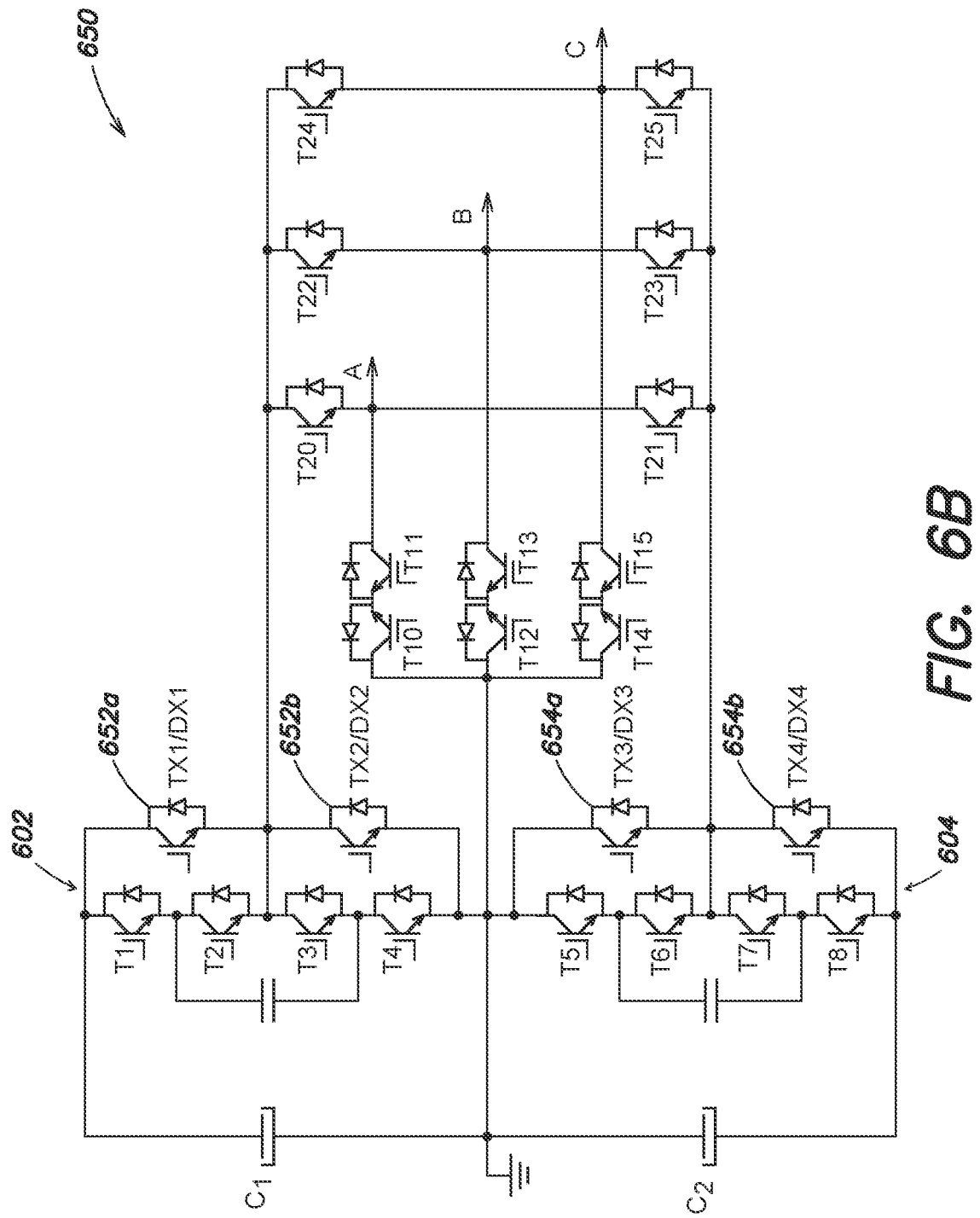
FIG. 6B is a schematic diagram of a power switching circuit according to aspects described herein.

FIG. 6B illustrates a schematic of a power switching circuit 650 in accordance with aspects described herein. In one example, the power switching circuit 650 is substantially the same as the power switching circuit 600 of FIG. 6A, except the power switching circuit 650 includes additional switches 652a, 652b, 654a, and 654b.

In some examples, the additional switches 652a and 652b can be coupled in parallel with the first DC/DC converter 602 and controlled to reduce conduction losses associated with operation of the first DC/DC converter 602. Likewise, the additional switches 654a and 654b can be coupled in parallel with the second DC/DC converter 604 and controlled to reduce conduction losses associated with operation of the second DC/DC converter 604. In one example, the additional switches may be transistors such as MOSFETs, IGBTs, BJTs; however, in other examples the additional switches may be diodes. In some examples, the additional switches may be a transistor with a parallel-coupled diode.

Figure 7A:
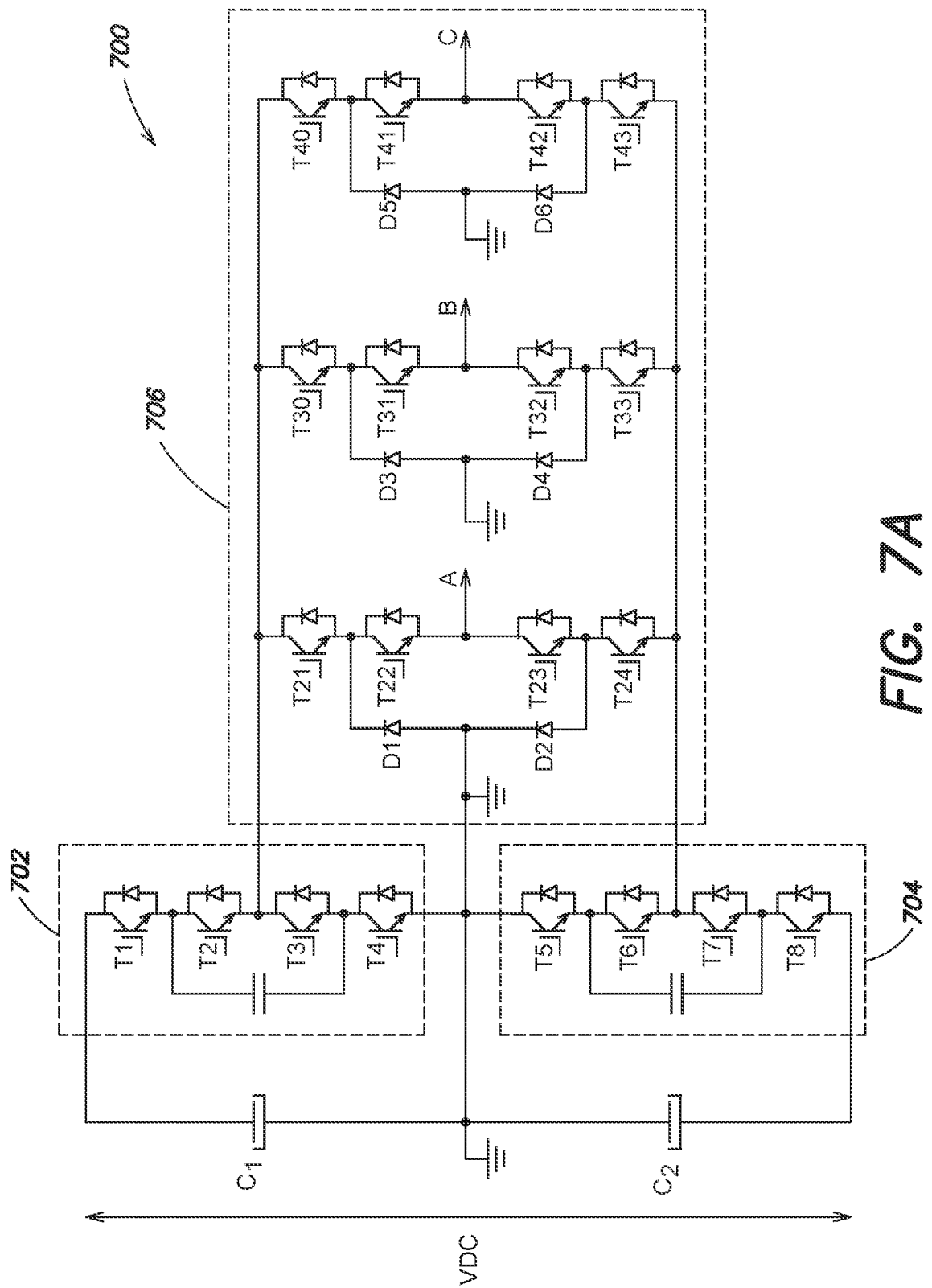
FIG. 7A is a schematic diagram of a power switching circuit according to aspects described herein.

FIG. 7A illustrates a schematic of a power switching circuit 700 in accordance with aspects described herein. Similar to the power switching circuit 200 of FIG. 2A, the power switching circuit 700 includes a first DC/DC converter 702, a second DC/DC converter 704, and a DC/AC inverter 706.

As shown, the DC/DC converters 702, 704 configured as FCML converters similar to the DC/DC converters 502, 504 of the power switching circuit 500 of FIG. 5 (i.e., m=2). In one example, the DC/AC inverter 706 includes three switching legs (n=3) each having two switching cells (k=2). In some examples, the DC/AC inverter 706 is configured as a three-phase NPC inverter (i.e., three-level). As such, the DC/AC inverter 706 can be operated as a three-level inverter configured to receive DC input voltages from the first DC/DC converter 702, the second DC/DC converter 704, and a midpoint/neutral connection. In some examples, the power switching circuit 700 can be operated in a similar manner as to the examples described above to provide a plurality of output signals with increased power handling capability.

Figure 7B:
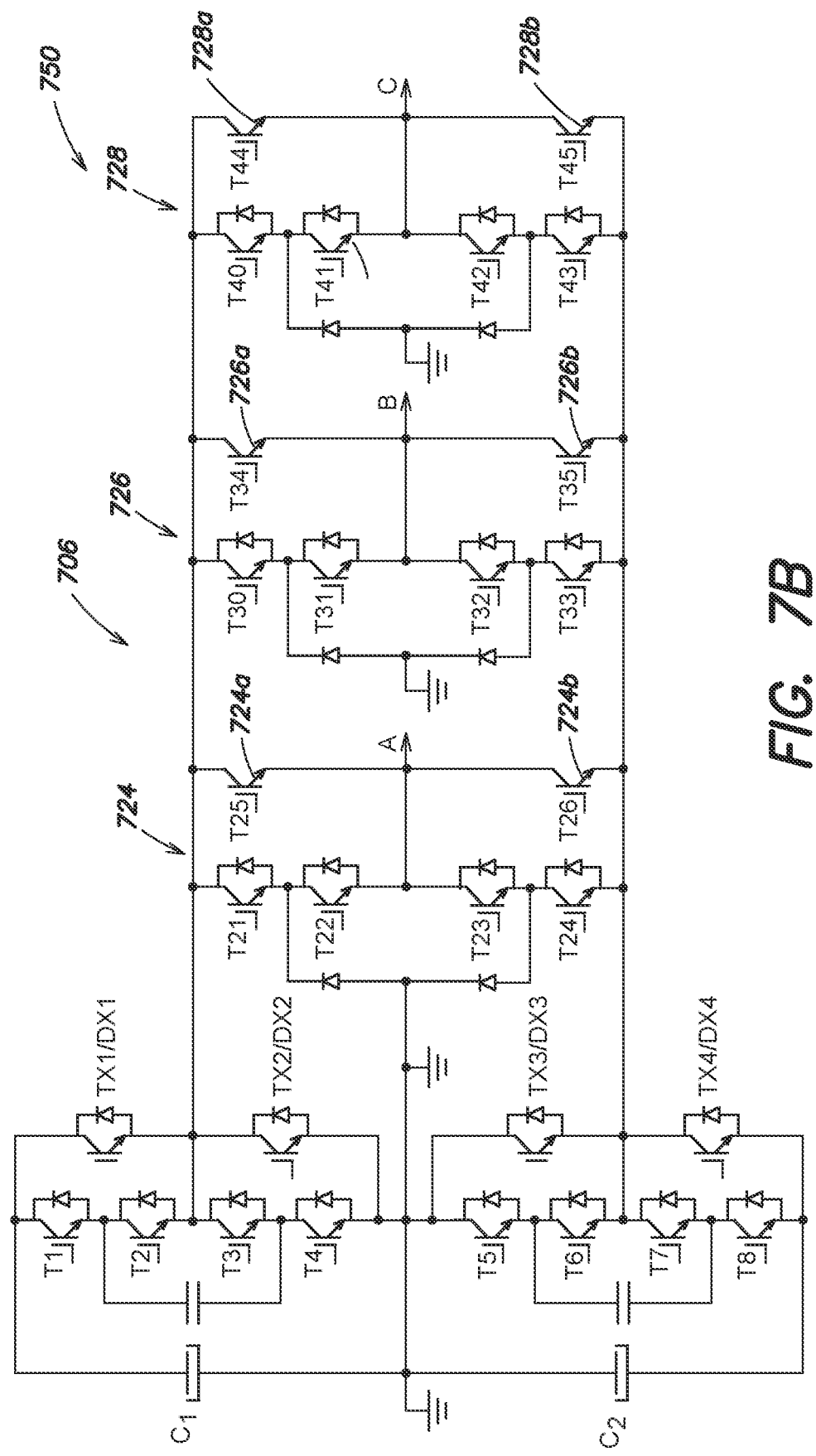
FIG. 7B is a schematic diagram of a power switching circuit according to aspects described herein.

FIG. 7B illustrates a schematic of a power switching circuit 750 in accordance with aspects described herein. In one example, the power switching circuit 750 is substantially the same as the power switching circuit 700, except the power switching circuit 750 includes additional switches 724a, 724b, 726a, 726b, 728a, and 728b.

In some examples, the additional switches 724a and 724b are coupled in parallel with a first switching leg 724 of the DC/AC inverter 706 and controlled to reduce conduction losses associated with operation of the DC/AC inverter 706. Similarly, the additional switches 726a and 726b are coupled in parallel with a second switching leg 726 of the DC/AC inverter 706 and the additional switches 728a and 728b are coupled in parallel with a third switching leg 728 of the DC/AC inverter 706 and controlled to reduce conduction losses associated with the operation of the DC/AC inverter 706. For example, the additional switches can improve current sharing within the DC/AC inverter 706. In one example, the additional switches each have the same voltage/current ratings as the other inverter switches, and as such, the voltage and current applied to each switch of the DC/AC inverter 706 can be reduced. In other examples, the additional switches may be configured with different semiconductor technologies (e.g., Silicon, Silicon Carbide, Gallium Nitride, etc.) to optimize current sharing. In one example, the additional switches may be transistors such as MOSFETs, IGBTs, or BJTs; however, in other examples the additional switches may be diodes. In some examples, the additional switches may be a transistor with a parallel-coupled diode.

In certain examples, additional switches may be coupled in series with the first and/or second switches of switching cells included in the DC/DC converters 702, 704 and/or the DC/AC inverter 706. In some examples, the additional switches can be configured as different device types and/or with different semiconductor technologies to further reduce losses. For example, a pair of switches may be configured as a hybrid Silicon IGBT-Silicon Carbide MOSFET device. During operation, the Silicon Carbide MOSFET can be switched prior to the Silicon IGBT, allowing the Silicon IGBT to switch at a lower voltage (e.g., 0V). As such, switching losses associated with the Silicon IGBT can be reduced or eliminated. In other examples, different types of devices and/or semiconductor technologies may be utilized depending on the power switching application.

Figure 8A:
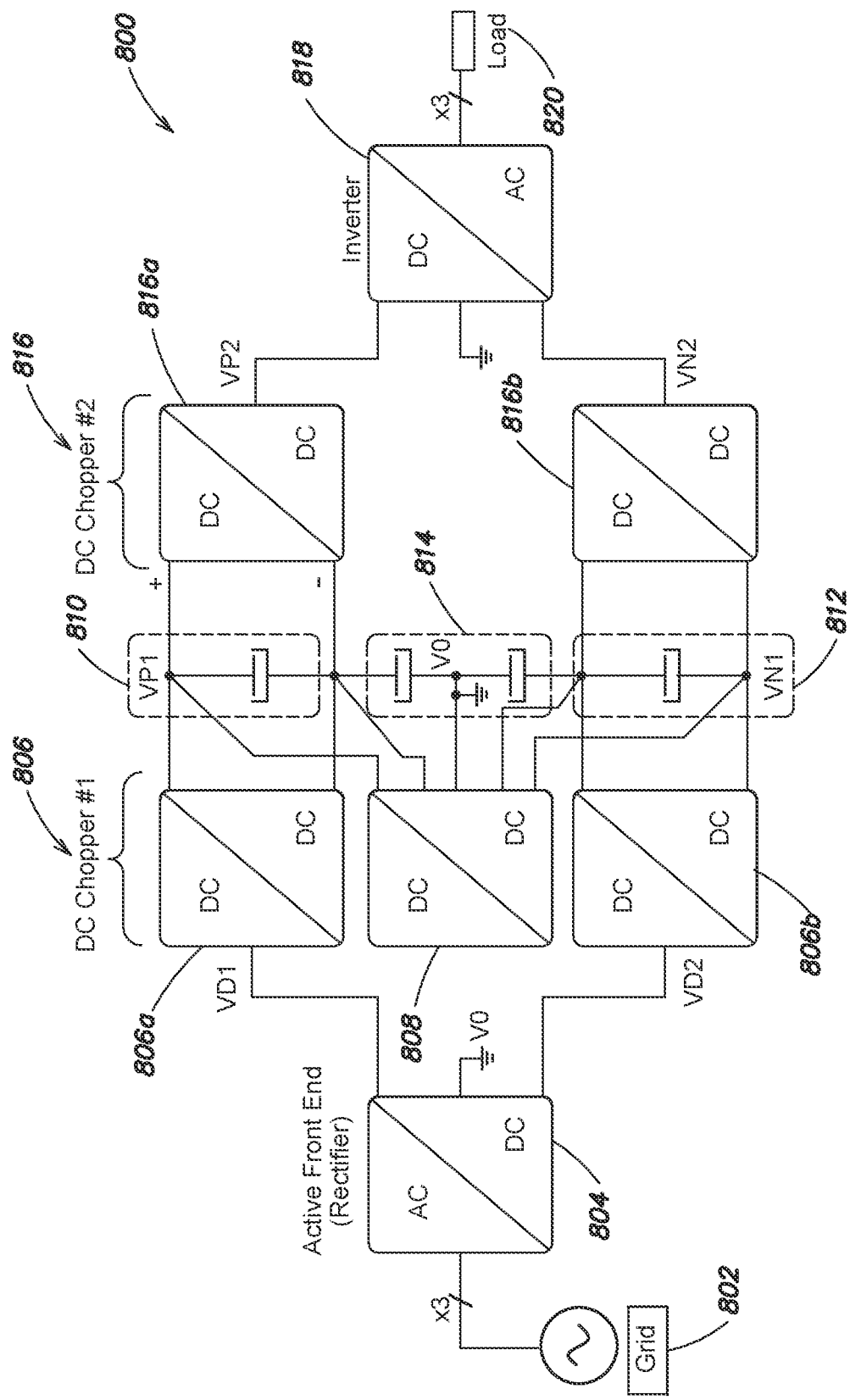
FIG. 8A is a block diagram of a power switching system according to aspects described herein.

In some examples, the power switching circuits described above can be combined with additional circuitry corresponding to specific power switching applications. For example, FIG. 8A illustrates a block diagram of a power drive system 800 in accordance with aspects described herein. As shown, the power drive system 800 includes an active front end (i.e., rectifier) 804, a first DC chopper stage 806, a DC bus balancer 808, a first DC voltage source 810, a second DC voltage source 812, a third DC voltage source 814, a second DC chopper stage 816, and a DC/AC inverter 818.

In some examples, the active front end 804 is configured to receive AC power from an electrical grid 802, convert the received AC power into DC power having an input DC voltage VDC, and provide the input DC voltage VDC to the first DC chopper stage 806. In one example, a first DC/DC converter 806a of the first DC chopper stage 806 receives a first DC voltage VD1 (i.e., a first portion of VDC) and a second DC/DC converter 806b of the first DC chopper stage 806 receives a second DC voltage VD2 (i.e., a second portion of VDC).

In some examples, the first and second DC/DC converters 806a, 806b can be operated in a similar manner as the DC/DC converters described in the examples above (e.g., the DC/DC converters 202, 204 of the power switching circuit 200 of FIG. 2A). For example, the first DC/DC converter 806a generates a variable DC voltage VP1 from the first DC voltage VD1 and provides the variable DC voltage VP1 to the first DC voltage source 810. Likewise, the second DC/DC converter 806b generates a variable DC voltage VN1 from the second DC voltage VD2 and provides the variable DC voltage VN1 to the second DC voltage source 812.

In some examples, the third DC voltage source 814 is coupled between the first and second DC voltage sources 810, 812 to support intermediate portions of the variable DC voltages VP1 and VN1. The bus balancer 808 is configured to regulate the distribution of the variable DC voltages VP1 and VN1 across the DC voltage sources 810, 812, 814.

In some examples, the first DC voltage source 810 provides at least a portion of the variable DC voltage VP1 to a first DC/DC converter 816a of the second chopper stage 816. Likewise, the second DC voltage source 812 provides at least a portion of the variable DC voltage VN1 to a second DC/DC converter 816b of the second chopper stage 816. In one example, the first and second DC/DC converters 816a, 816b can be operated in a similar manner as the DC/DC converters 806a, 806b of the first chopper stage 806. As such, the first DC/DC converter 816a generates a variable DC voltage VP2 from at least a portion of the variable DC voltage VP1 and the second DC/DC converter 816b generates a variable DC voltage VN2 from at least a portion of the variable DC voltage VN1. In some examples, the variable DC voltages VP2 and VN2 may oscillate between different (e.g., lower) voltage levels than the variable DC voltages VP1 and VN1.

The variable DC voltages VP2 and VN2 are provided to the DC/AC inverter 818. In one example, the DC/AC inverter 818 can be operated in a similar manner as the DC/AC inverters described in the examples above (e.g., the DC/AC inverter 206 of the power switching circuit 200 of FIG. 2A). As such, the DC/AC inverter 818 can be operated to provide a plurality of output signals to the load 820.

Figures 1, 8B:
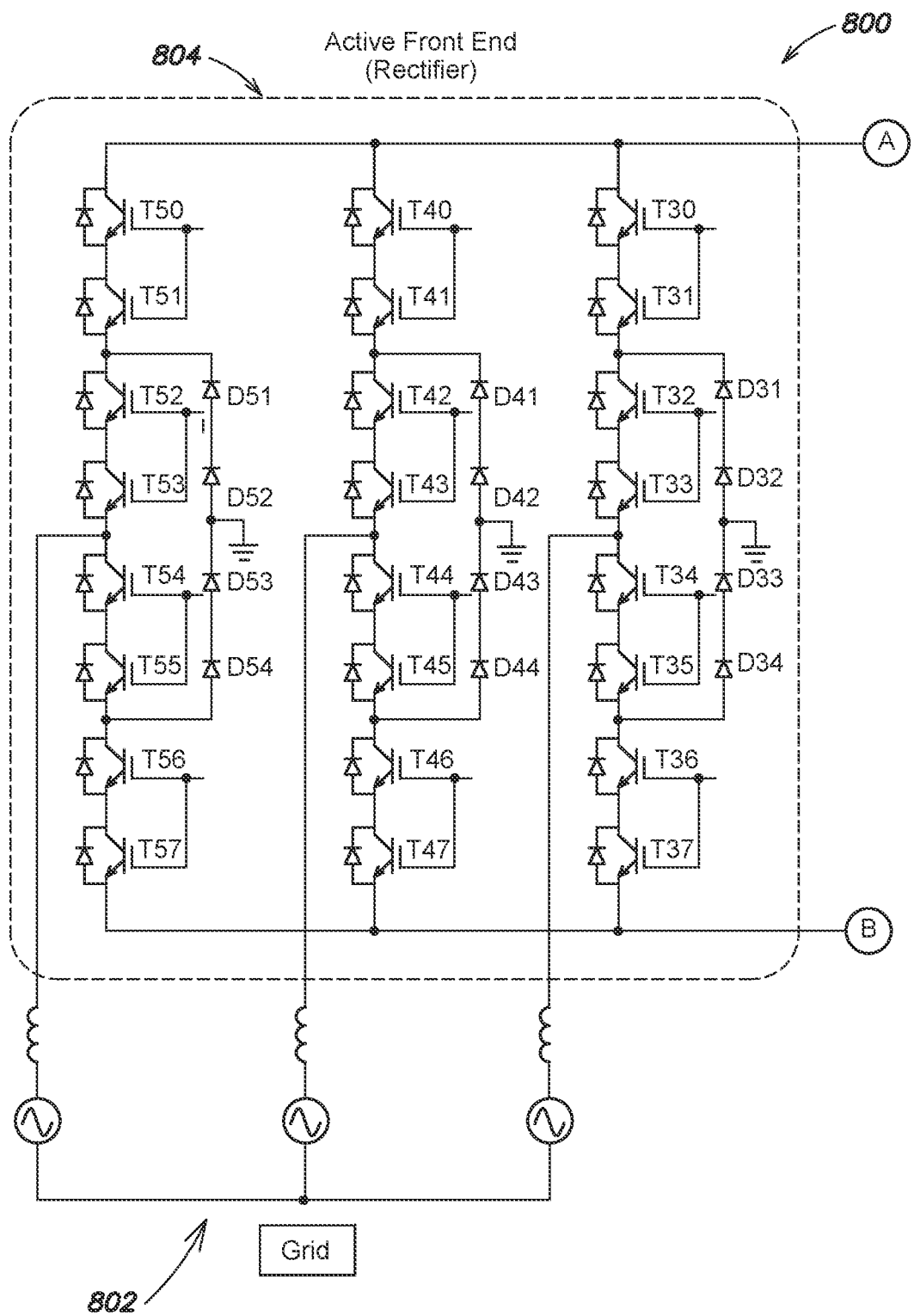
FIG. 8B is a schematic diagram of a power switching system according to aspects described herein.
Figures 2, 8B:
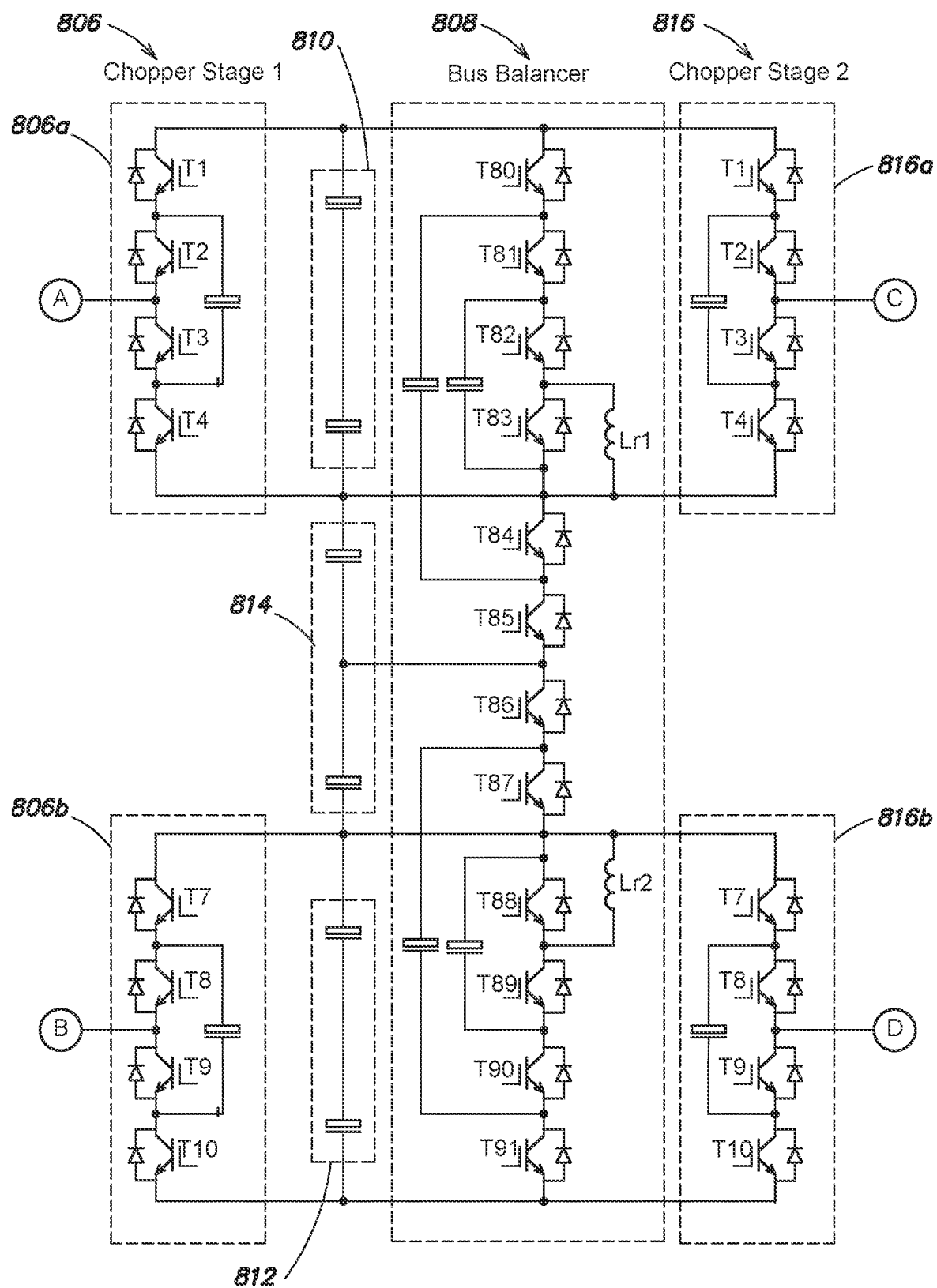
Figures 3, 8B:
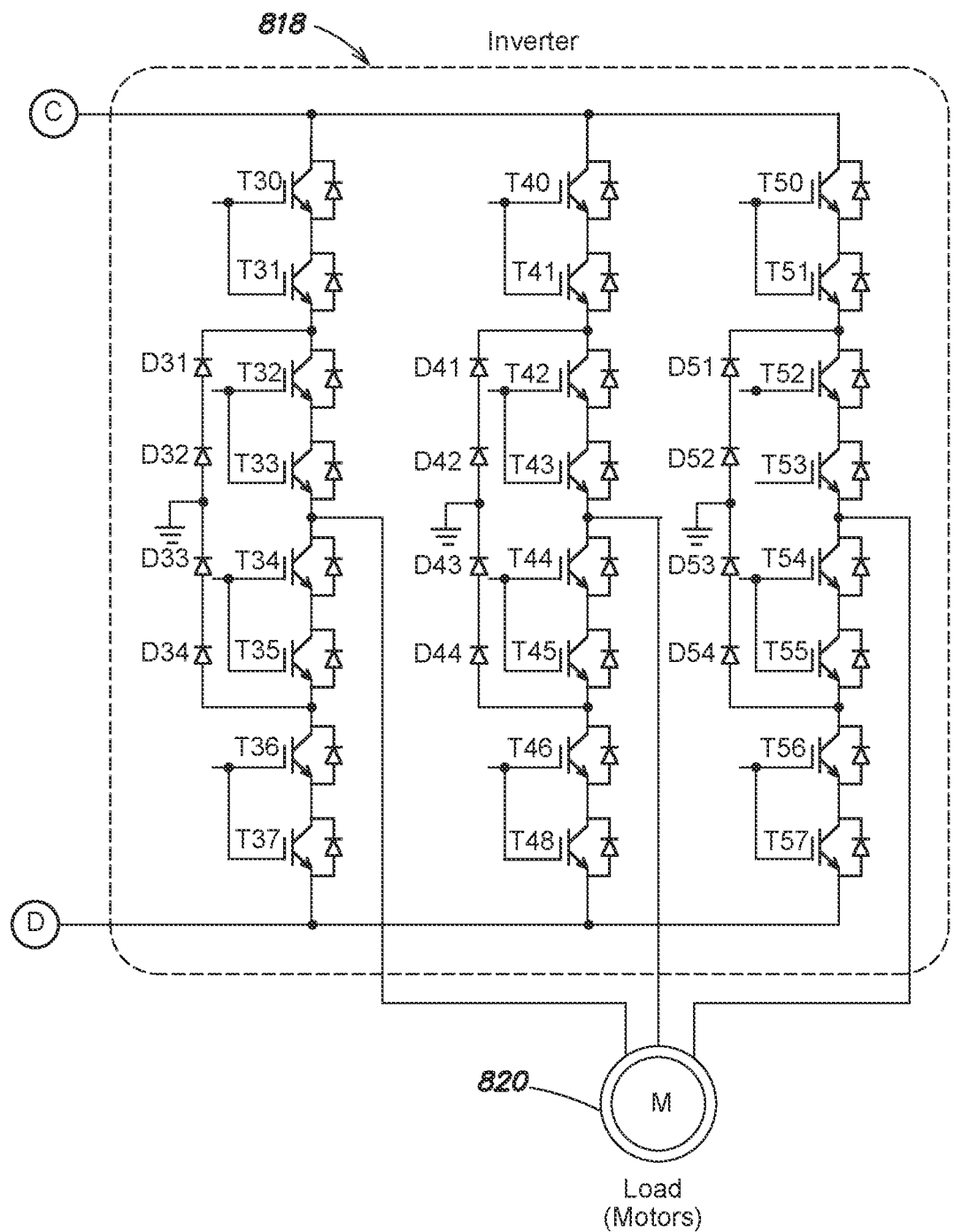

FIG. 8B illustrates a schematic diagram of the power drive system 800 in accordance with aspects described herein. As shown, both the active front end 804 and the DC/AC inverter 818 can be configured as three-phase NPC inverters having three switching legs with four switching cells each (i.e., n=3, k=2); however, in other examples the active front end 804 and the DC/AC inverter 818 may be configured differently. In some examples, the first and second DC/DC converters 806a, 806b of the first chopper stage 806 and the first and second DC/DC converters 816a, 816b of the second chopper stage 816 are configured as FCML converters (i.e., m=2); however, in other examples, the DC/DC converters may be configured differently. Similar to examples described above, the DC voltages sources 810, 812, and 814 can include a plurality of capacitors. An example of a multi-level bus balancer 808 coupled to each of the DC voltage sources 810, 812, and 814 is shown.

Figure 9A:
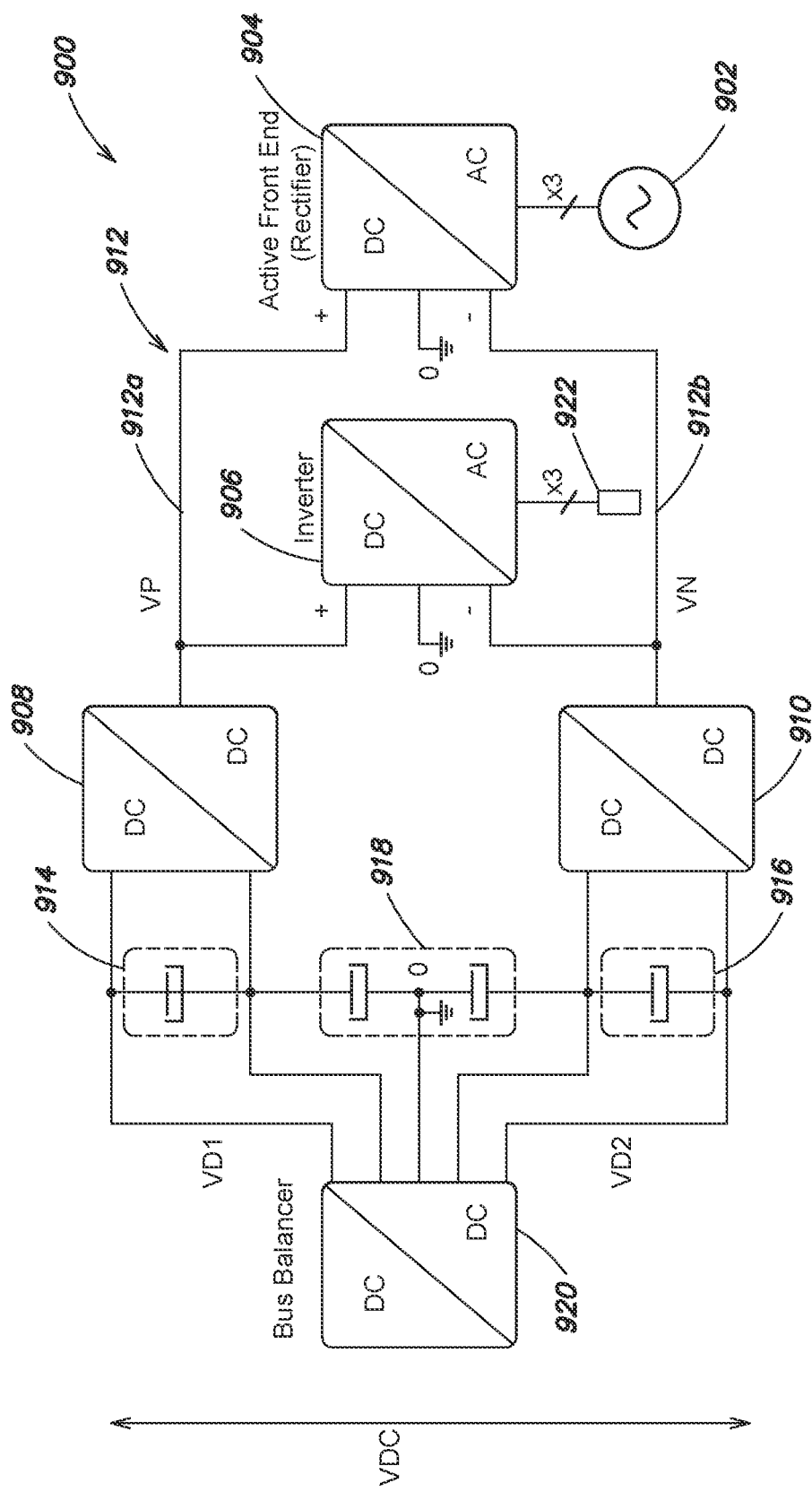
FIG. 9A is a block diagram of a power switching system according to aspects described herein.

FIG. 9A illustrates a block diagram of an uninterruptible power supply (UPS) system 900 in accordance with aspects described herein. As shown, the UPS system 900 includes an active front end 904, a DC/AC inverter 906, a first DC/DC converter 908, a second DC/DC converter 910, a DC bus 912, a first DC voltage source 914, a second DC voltage source 916, a third voltage source 918, and a DC bus balancer 920.

In one example, the active front end 904, the DC/AC inverter 906, and the first and second DC/DC converters 908, 910 are each be coupled to the DC bus 912. The DC bus 912 includes a positive rail 912a coupled to the active front end 904, the DC/AC inverter 906, and the first DC/DC converter 908 and a negative rail 912b coupled to the active front end 904, the DC/AC inverter 906, and the second DC/DC converter 910.

In some examples, the active front end 904 is an AC/DC converter (e.g., rectifier) configured to receive AC power from an electrical grid 902 and convert the received AC power into DC power having an input DC voltage VDC. The input DC voltage VDC is provided to the first DC voltage source 914 and the second DC voltage source 916 via the first and second DC/DC converters 908, 910.

In some examples, the third DC voltage source 918 is coupled between the first and second DC voltage sources 914, 916 to store an intermediate portion of the input DC voltage VDC. The bus balancer 918 is configured to regulate the distribution of the input DC voltage VDC across the DC voltage sources 914, 916, 918.

In one example, the first and second DC/DC converters 908, 910 can be operated in a similar manner as the DC/DC converters described above (e.g., the DC/DC converters 202, 204 of the power switching circuit 200 of FIG. 2A). As such, the first DC/DC converter 908 generates a variable DC voltage VP from a first portion VD1 of the input DC voltage VDC. Likewise, the second DC/DC converter 910 generates a variable DC voltage VN from a second portion VD2 of the input DC voltage VDC. The variable DC voltages VP and VN are provided to the DC/AC inverter 906 via the positive and negative DC bus rails 912a, 912b.

In one example, the DC/AC inverter 906 is configured to operate in a similar manner as the DC/AC inverters described above (e.g., the DC/AC inverter 206 of the power switching circuit 200 of FIG. 2A). For example, the DC/AC inverter 206 can include a plurality of switching legs configured to be operated in the static and transition states to derive a plurality of output signals from the variable DC voltages VP and VN. The plurality of output signals may be AC signals provided to the load 920.

In some examples, the active front end 904 is configured to operate as a bi-directional converter. For example, in addition to converting AC power received from the grid 902, the active front end 904 can receive DC power from the DC bus 912 (i.e., the variable DC voltages VP and VN), convert the DC power to AC power, and backfeed AC power to the grid 902.

Figure 9B:
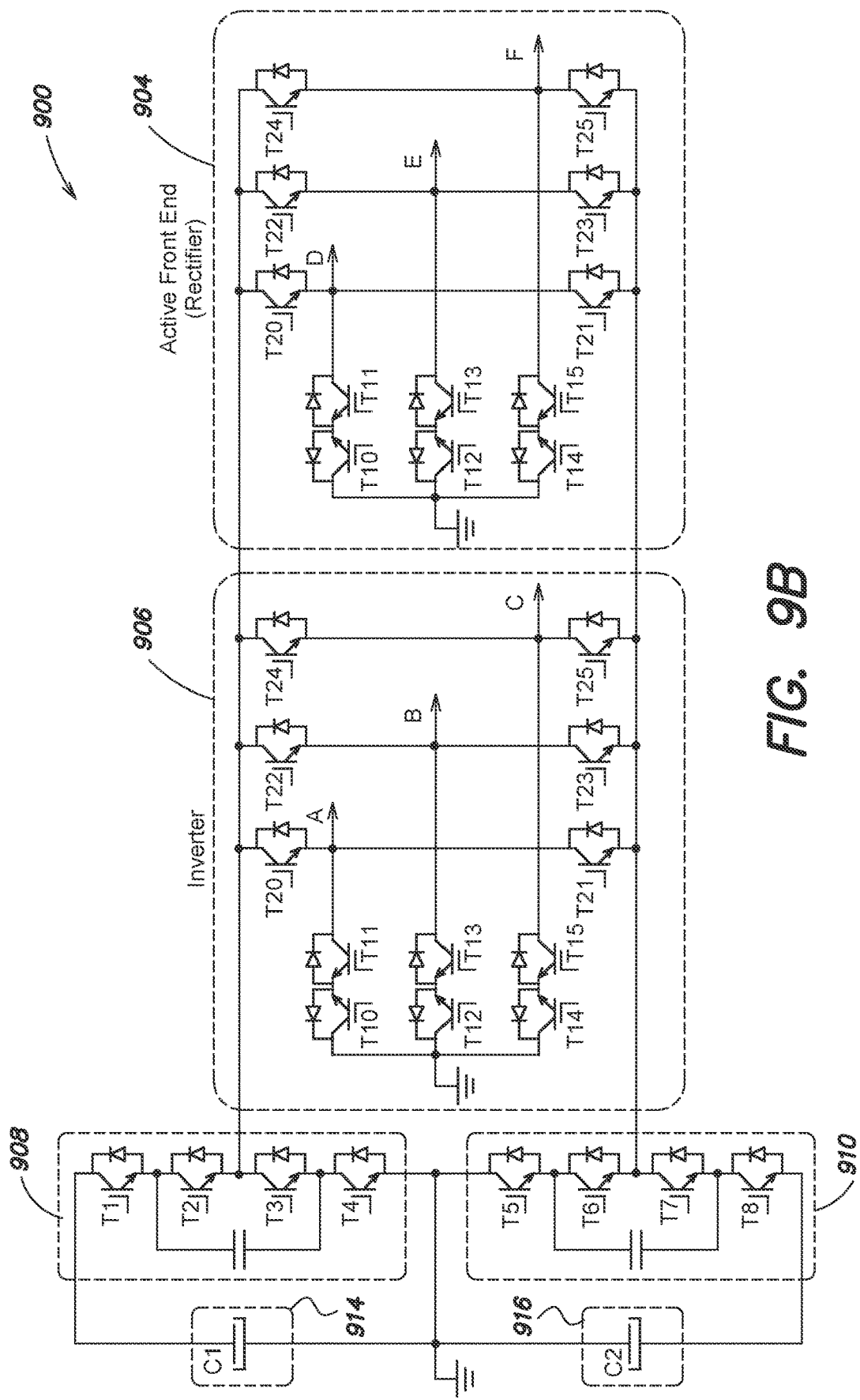
FIG. 9B is a schematic diagram of a power switching system according to aspects described herein.
Figure 10A:
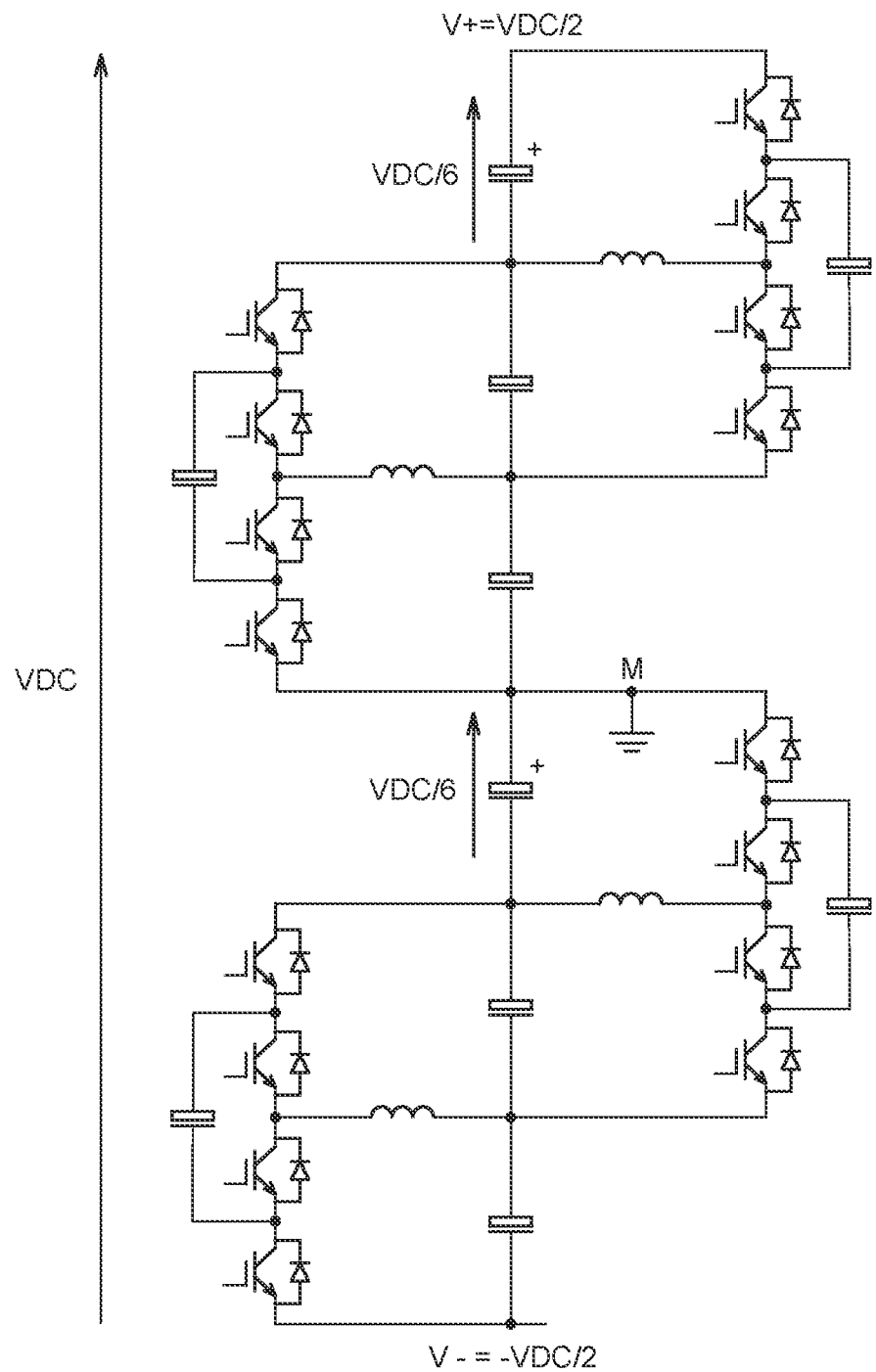
FIGS. 10A-10D are schematic diagrams of DC bus balancer circuits according to aspects described herein.
Figure 10B:
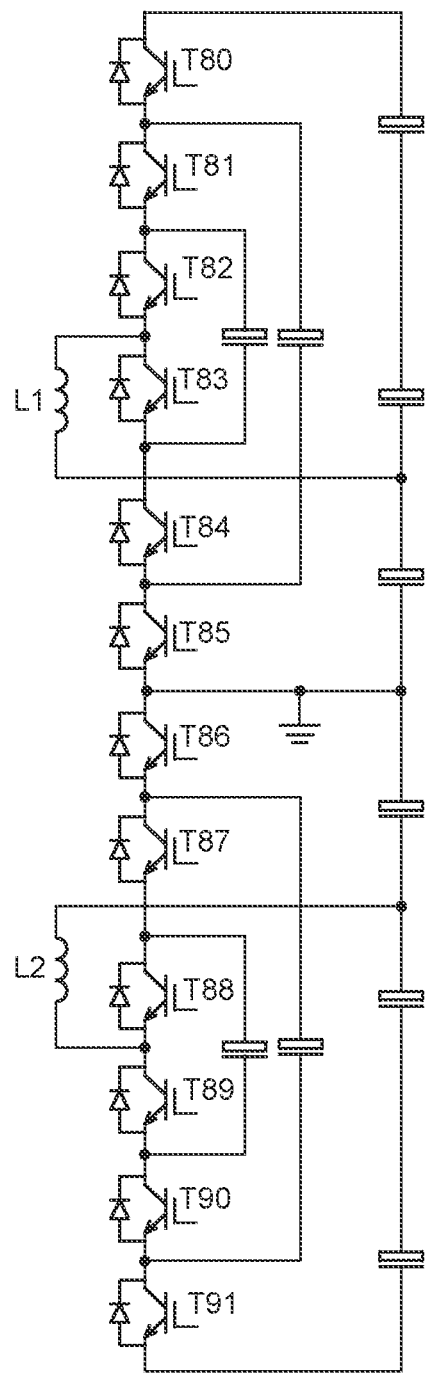
Figure 10C:
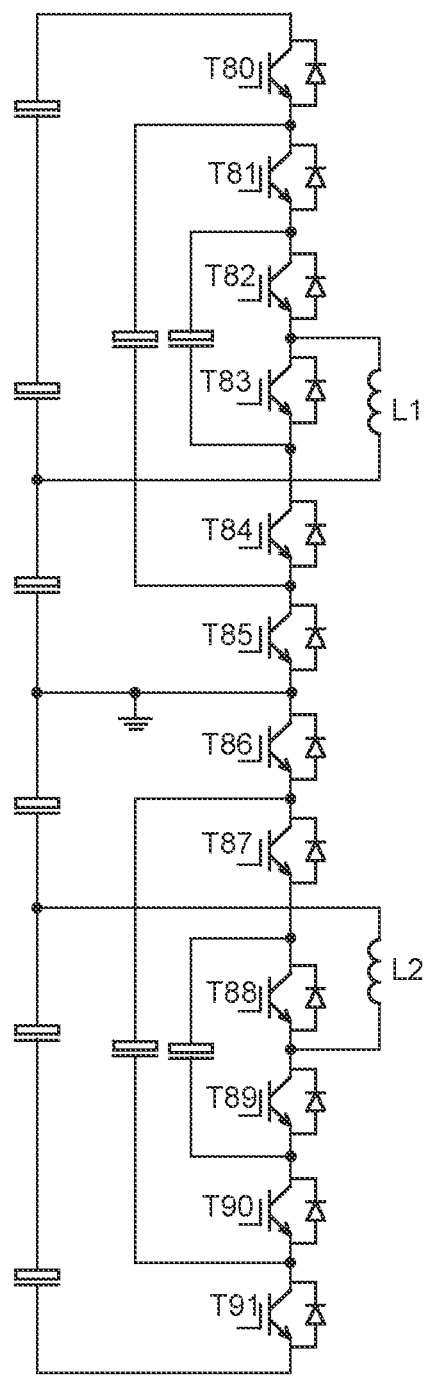
Figure 10D:
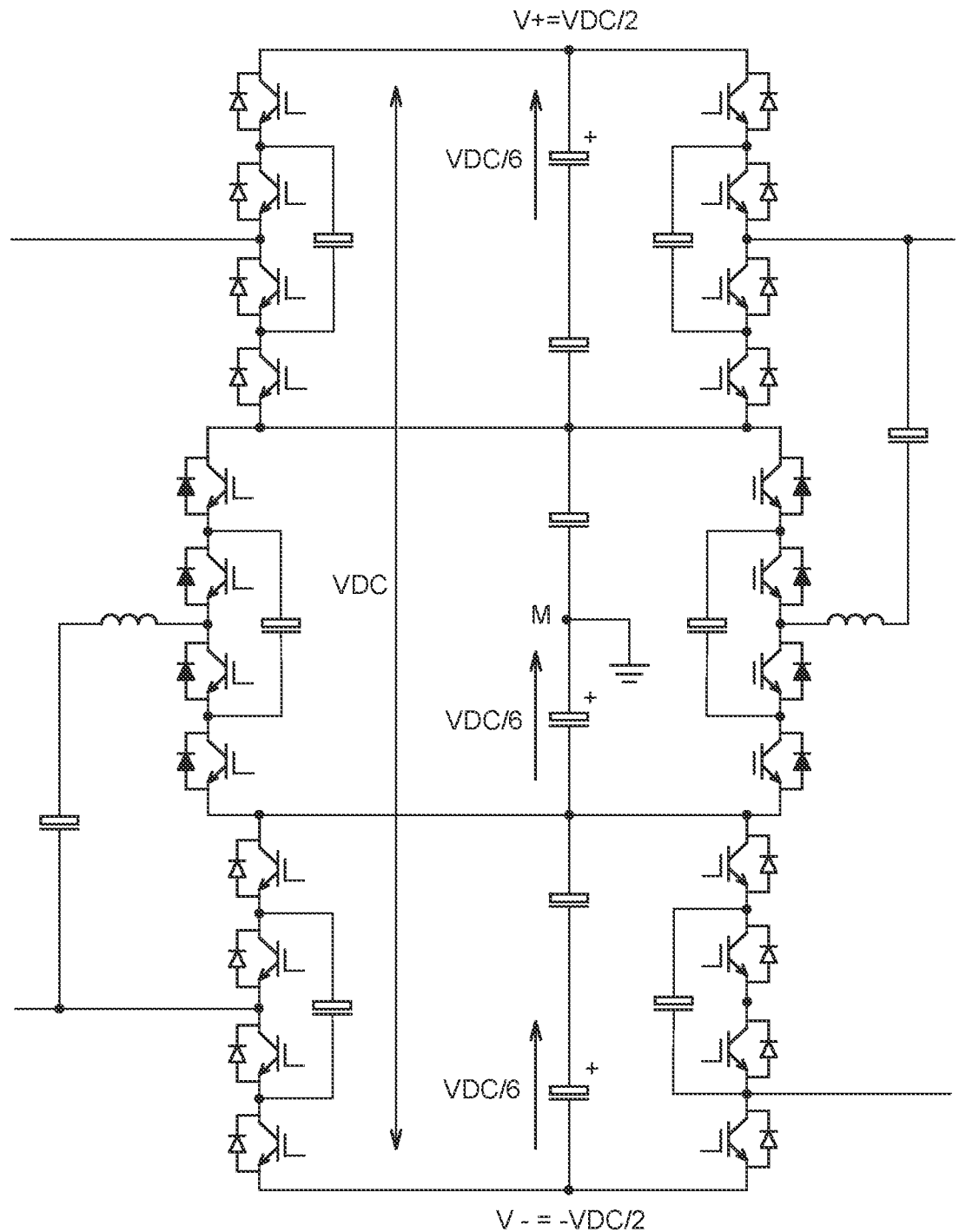

FIG. 9B illustrates a schematic diagram of the UPS system 900 in accordance with aspects described herein. As shown, both the active front end 904 and the DC/AC inverter 906 can be configured as three-phase T-NPC inverters having three switching legs with two switching cells each (i.e., n=3, k=2); however, in other examples, the active front end 906 and the DC/AC inverter 904 may be configured differently. In some examples, the first and second DC/DC converters 908, 910 can be configured as FCML converters (i.e., m=2); however, in other examples, the DC/DC converters may be configured differently. Similar to examples described above, the DC voltages sources 914 and 916 can include a plurality of capacitors.

FIGS. 10A-10D illustrate various DC bus balancer configurations in accordance with aspects described herein. Each of the DC bus balancer configurations of FIGS. 10A-10D can be included in any of the power switching circuits and systems described above. For example, each of the DC bus balancer configurations can be utilized as the DC bus balancers 122, 162 of the power switching topologies 120, 160 of FIGS. 1B and 1D. Likewise, each DC bus balancer configuration can be utilized as the DC bus balancer 808 of the power driver system 800 of FIG. 8A and the DC bus balancer 920 of the UPS system 900 of FIG. 9A.

Figure 11:
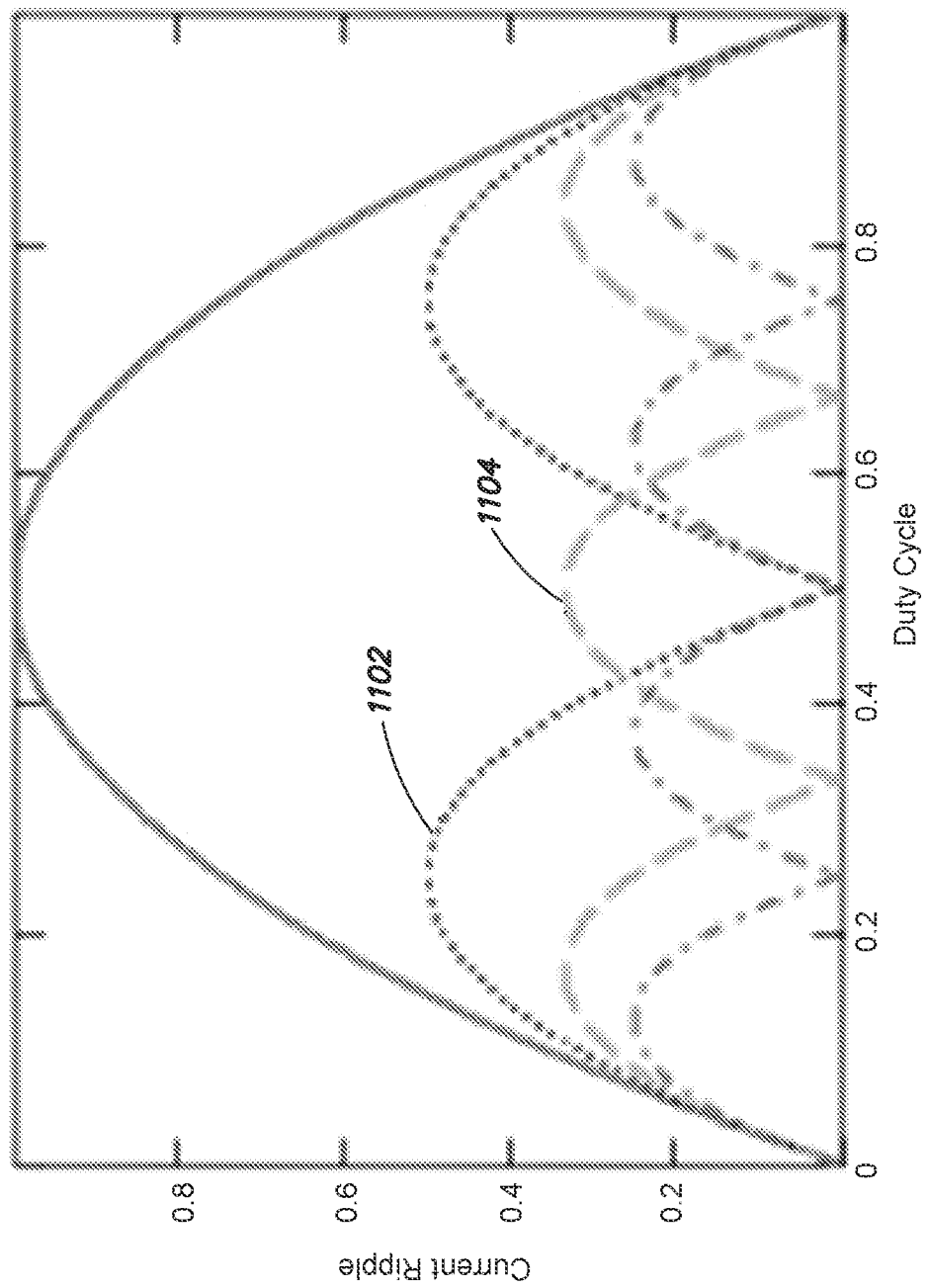
FIG. 11 is a graph illustrating choke ripple current as a function of duty cycle for various DC bus balancer configurations according to aspects described herein.

FIG. 11 is a graph illustrating choke current ripple as a function of duty cycle for various DC bus balancer configurations in accordance with aspects described herein. In some examples, the choke current ripple corresponds to the type of DC/DC converter being implemented in each DC bus balancer configuration and the operating duty cycle. For example, trace 1102 in FIG. 11 corresponds to the choke current ripple of a DC bus balancer configuration implemented as a 3-level DC/DC converter. As shown, the choke current ripple can be minimized by operating the 3-level DC/DC converter with a 50% duty cycle. Likewise, trace 1104 corresponds to the choke current ripple of a DC bus balancer configuration implemented as a 4-level DC/DC converter, and the choke ripple can be minimized by operating the 4-level DC/DC converter with a 33% or 66% duty cycle. As such, by operating the DC/DC converters of DC bus balancer configurations with optimal duty cycles, current ripple and choke volume can be minimized.

In various examples, a controller may be configured to operate any of the power switching circuits and systems described above. For example, the controller can control any of the DC/DC converters, DC/AC inverters, or other circuitry provided herein. Using data stored in associated memory, the controller may be operable to execute one or more instructions that may result in the manipulation of one or more power switches included in the power conversion circuitry. In some examples, the controller can include one or more processors or other types of controllers. The controller may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

As described above, more efficient multi-level inverter topologies for use in medium- and high-voltage power switching applications are provided herein. In at least one embodiment, a first conversion stage generates variable DC voltages from input DC voltages and a second conversion stage derives a plurality of AC output signals from the variable DC voltages. In one example, the variable DC voltages are provided using multi-level DC/DC converters and the AC outputs are derived using a DC/AC inverter. Such topologies can provide improved efficiency in medium- and high-voltage power switching applications, and in some examples, efficiency and power density can be improved along with reductions in cost.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A power switching circuit comprising:
   a first DC bus and a second DC bus;
   a first DC/DC converter having a first input coupled to the first DC bus and configured to receive a first input DC voltage corresponding to a first allocated portion of an input DC voltage between the first DC bus and the second DC bus and an output configured to provide a first output DC voltage;
   a second DC/DC converter having a first input coupled to the second DC bus and configured to receive a second input DC voltage corresponding to a second allocated portion of the input DC voltage between the first DC bus and the second DC bus and an output configured to provide a second output DC voltage;
   a DC/AC inverter having a first input coupled to the output of the first DC/DC converter and a second input coupled to the output of the second DC/DC converter, the DC/AC inverter including n (n>2) switching legs, each switching leg having k switching cells coupled between the first input and the second input; and
   at least one controller coupled to the first DC/DC converter, the second DC/DC converter, and the DC/AC inverter, the at least one controller configured to operate the DC/AC inverter to provide n AC signals to at least one load coupled to the DC/AC inverter by
   operating, at no time during a complete cycle of at least one of the n AC signals, fewer than two of the n switching legs in a static state, and
   operating, at no time during the complete cycle of the at least one of the n AC signals, fewer than a remaining n−2 of the n switching legs in a transition state,
   wherein the at least one controller operates each switching leg of the n switching legs in either the static state or the transition state at any given time during the complete cycle of the at least one of the n AC signals.

2. The power switching circuit of claim 1, further comprising:
   a first DC voltage source and a second DC voltage source coupled between the first DC bus and the second DC bus, the first DC voltage source configured to provide the first input DC voltage to the first DC/DC converter and the second DC voltage source configured to provide the second input DC voltage to the second DC/DC converter.

3. The power switching circuit of claim 2, wherein the first DC bus is a positive DC bus and the second DC bus is a negative DC bus.

4. The power switching circuit of claim 1, wherein the first and second DC/DC converters each include m switching cells, and each switching cell of the m switching cells includes at least a first switch and a second switch, the first and second switches being configured to operate in complementary states.

5. The power switching circuit of claim 1, wherein the controller is further configured to operate the first DC/DC converter such that the first output DC voltage is a positive variable DC voltage having a first duty cycle and to operate the second DC/DC converter such that the second output DC voltage is a negative variable DC voltage having a second duty cycle.

6. The power switching circuit of claim 5, wherein the first input of the DC/AC inverter is coupled directly to the output of the first DC/DC converter to receive the positive variable DC voltage and the second input of the DC/AC inverter is coupled directly to the output of the second DC/DC converter to receive negative variable DC voltage.

7. The power switching circuit of claim 6, wherein each switching leg operating in the static state is configured to provide a static output voltage to the load derived from one of the positive DC variable voltage and the negative DC variable voltage, the static output voltage corresponding to one of the most positive and most negative portions of the n AC signals.

8. The power switching circuit of claim 7, wherein an output of each switching leg operating in the static state is coupled via at least one of the k switching cells to one of the first and second inputs of the DC/AC inverter.

9. The power switching circuit of claim 6, wherein each switching leg operating in the transition state is configured to provide a transition output voltage to the at least one load derived from the positive DC variable voltage and the negative variable DC voltage, the transition output voltage corresponding to intermediate portions of the n AC signals.

10. The power switching circuit of claim 9, wherein an output of each switching leg operating in the transition state is switched via at least one of the k switching cells between at least the first and second inputs of the DC/AC inverter.

11. A non-transitory computer-readable medium storing thereon sequences of computer-executable instructions for operating a power switching circuit, the sequences of computer-executable instructions including instructions that instruct at least one processor to:
receive a first input DC voltage at an input of a first DC/DC converter coupled to a first DC bus, and a second input DC voltage at an input of a second DC/DC converter coupled to a second DC bus, the first input DC voltage corresponding to a first allocated portion of an input DC voltage between the first DC bus and the second DC bus and the second input DC voltage corresponding to a second allocated portion of the input DC voltage between the first DC bus and the second DC bus;
control the first DC/DC converter to provide a first DC voltage and the second DC/DC converter to provide a second DC voltage;
receive the first DC voltage at a first input of a DC/AC inverter and receiving the second DC voltage at a second input of the DC/AC inverter, the DC/AC inverter having n (n>2) switching legs having k switching cells; and
control the DC/AC inverter to provide n AC output signals derived from the first and second DC voltages by
operating, at no time during a complete cycle of at least one of the n AC signals, fewer than two of the n switching legs in a static state, and
operating, at no time during the complete cycle of the at least one of the n AC signals, fewer than a remaining n−2 switching legs in a transition state,
wherein the at least one controller operates each switching leg of the n switching legs in either the static state or the transition state at any given time during the complete cycle of the at least one of the n AC signals.

12. The non-transitory computer-readable medium of claim 11, wherein controlling the first DC/DC converter to provide the first DC voltage further includes operating the first DC/DC converter such that the first DC voltage is a first variable DC voltage having a first duty cycle and controlling the second DC/DC converter to provide the second DC voltage further includes operating the second DC/DC converter such that the second DC voltage is a second variable DC voltage having a second duty cycle.

13. The non-transitory computer-readable medium of claim 12, wherein operating each respective switching leg in the static state includes controlling the switching leg to provide a static output voltage derived from one of the first variable DC voltage and the second variable DC voltage, the static output voltage corresponding to one of the most positive and most negative portions of the n AC output signals.

14. The non-transitory computer-readable medium of claim 12, wherein operating each respective switching leg in the transition state includes controlling the switching leg to provide an output voltage derived from the first variable DC voltage and the second variable DC voltage, the transition output voltage corresponding to intermediate portions of the n AC output signals.

15. An Uninterruptible Power Supply (UPS) system, the UPS system comprising:
an input configured to be coupled to an AC source and to receive input AC power from the AC source;
an output configured to provide output AC power to a load;
a converter coupled to the input and configured to convert the input AC power into DC power;
a first DC bus and a second DC bus coupled to the converter and configured to receive DC power from the converter;
a first DC/DC converter having a first input coupled to the first DC bus and configured to receive a first input DC voltage corresponding to a first allocated portion of an input DC voltage between the first DC bus and the second DC bus and an output configured to provide a first output DC voltage;
a second DC/DC converter having a first input coupled to the second DC bus and configured to receive a second input DC voltage corresponding to a second allocated portion of the input DC voltage between the first DC bus and the second DC bus and an output configured to provide a second output DC voltage;
at least one DC/AC inverter having a first input coupled to the output of the first DC/DC converter and a second input coupled to the output of the second DC/DC converter, the at least one DC/AC inverter including n (n>2) switching legs, each switching leg having k switching cells coupled between the first input and the second input; and
at least one controller coupled to the first DC/DC converter, the second DC/DC converter, and the DC/AC inverter, the at least one controller configured to operate the at least one DC/AC inverter to provide n AC signals to the output coupled to the at least one DC/AC inverter by operating, at no time during a complete cycle of at least one of the n AC signals, fewer than two of the n switching legs in a static state, and operating, at no time during the complete cycle of the at least one of the n AC signals, fewer than a remaining n−2 of the n switching legs in a transition state, wherein the at least one controller operates each switching leg of the n switching legs in either the static state or the transition state at any given time during the complete cycle of the at least one of the n AC signals.

16. The UPS system of claim 15, further comprising:

a first DC voltage source and a second DC voltage source coupled between the first DC bus and the second DC bus, the first DC voltage source configured to provide the first input DC voltage to the first DC/DC converter and the second DC voltage source configured to provide the second input DC voltage to the second DC/DC converter.

17. The UPS system of claim 16, wherein the first DC bus is a positive DC bus and the second DC bus is a negative DC bus.

18. The UPS system of claim 15, wherein the controller is further configured to operate the first DC/DC converter such that the first output DC voltage is a positive variable DC voltage having a first duty cycle and to operate the second DC/DC converter such that the second output DC voltage is a negative variable DC voltage having a second duty cycle.

19. The UPS system of claim 18, wherein each switching leg operating in the static state is configured to provide a static output voltage to the output derived from one of the positive DC variable voltage and the negative DC variable voltage, the static output voltage corresponding to one of the most positive and most negative portions of the n AC signals.

20. The UPS system of claim 18, wherein each switching leg operating in the transition state is configured to provide a transition output voltage to the output derived from the positive DC variable voltage and the negative variable DC voltage, the transition output voltage corresponding to intermediate portions of the n AC signals.

* * * * *